US010996192B2

(12) United States Patent
Araki et al.

(10) Patent No.: US 10,996,192 B2
(45) Date of Patent: May 4, 2021

(54) GAS SENSOR

(71) Applicant: DENSO CORPORATION, Kariya (JP)

(72) Inventors: Takashi Araki, Kariya (JP); Takehito Kimata, Kariya (JP); Mitsunobu Nakatou, Kariya (JP)

(73) Assignee: DENSO CORPORATION, Kariya (JP)

( * ) Notice: Subject to any disclaimer, the term of this patent is extended or adjusted under 35 U.S.C. 154(b) by 23 days.

(21) Appl. No.: 15/759,297

(22) PCT Filed: Sep. 9, 2016

(86) PCT No.: PCT/JP2016/076567
§ 371 (c)(1),
(2) Date: Mar. 12, 2018

(87) PCT Pub. No.: WO2017/047511
PCT Pub. Date: Mar. 23, 2017

(65) Prior Publication Data
US 2018/0252671 A1 Sep. 6, 2018

(30) Foreign Application Priority Data

Sep. 17, 2015 (JP) .............................. JP2015-184347
Apr. 18, 2016 (JP) .............................. JP2016-082923

(51) Int. Cl.
*G01N 27/407* (2006.01)
*G01N 27/406* (2006.01)
*G01N 27/41* (2006.01)

(52) U.S. Cl.
CPC ..... *G01N 27/4077* (2013.01); *G01N 27/4067* (2013.01); *G01N 27/41* (2013.01)

(58) Field of Classification Search
CPC ........... G01N 27/4077; G01N 27/4067; G01N 27/41; G01N 27/02; G01N 27/4161;
(Continued)

(56) References Cited

U.S. PATENT DOCUMENTS 6,348,141 B1 * 2/2002 Kato .................. G01N 27/4077
204/426
2004/0144645 A1 * 7/2004 Yamada ............. G01N 27/4077
204/424
(Continued)

FOREIGN PATENT DOCUMENTS

JP 2000304719 A * 11/2000 ......... G01N 27/4077
JP 2001-74686 3/2001
(Continued)

*Primary Examiner* — Nicholas A Smith
*Assistant Examiner* — Vivian A Tran
(74) *Attorney, Agent, or Firm* — Nixon & Vanderhye P.C.

(57) ABSTRACT

A gas sensor is equipped with a sensor element which detects a specific gas concentration within a gas that is being measured, a housing having the sensor element disposed in the interior thereof and retained therein, and an element cover disposed at an axial-direction tip end of the housing. The tip of the sensor element is provided with a gas introduction part. The element cover has an inner cover and an outer cover, with a space opened between the inner cover and outer cover. Inner side flow holes provided in the inner cover are disposed closer to an axial-direction base end than is a tapered-diameter step part. The distance between the tip of the sensor element and the inner-side flow holes of the inner cover, with respect to an axial direction, is less than or equal to 1.6 mm.

12 Claims, 17 Drawing Sheets

(58) Field of Classification Search
CPC ...... G01N 27/48; G01N 27/49; G01N 27/403; G01N 27/406; G01N 27/407–4078; G01N 27/409; G01N 27/417; G01N 27/419
See application file for complete search history.

(56) References Cited

U.S. PATENT DOCUMENTS

| | | | |
|---|---|---|---|
| 2004/0159547 A1* | 8/2004 | Haraguchi | G01N 33/0037 |
| | | | 204/424 |
| 2005/0016849 A1 | 1/2005 | Ikoma et al. | |
| 2008/0142364 A1* | 6/2008 | Naito | G01N 27/4071 |
| | | | 204/427 |
| 2008/0236248 A1 | 10/2008 | Ikoma et al. | |
| 2009/0020425 A1 | 1/2009 | Yamada | |
| 2016/0076919 A1* | 3/2016 | Murakami | G01D 11/245 |
| | | | 73/431 |
| 2016/0153814 A1* | 6/2016 | Seimori | G01D 11/245 |
| | | | 73/431 |
| 2016/0209354 A1 | 7/2016 | Araki et al. | |

FOREIGN PATENT DOCUMENTS

| | | | |
|---|---|---|---|
| JP | 2003149199 A * | 5/2003 | |
| JP | 2003-161717 | 6/2003 | |
| JP | 2006-91009 | 4/2006 | |
| JP | 2007-3216 | 1/2007 | |
| JP | 2015-145831 | 8/2015 | |

* cited by examiner

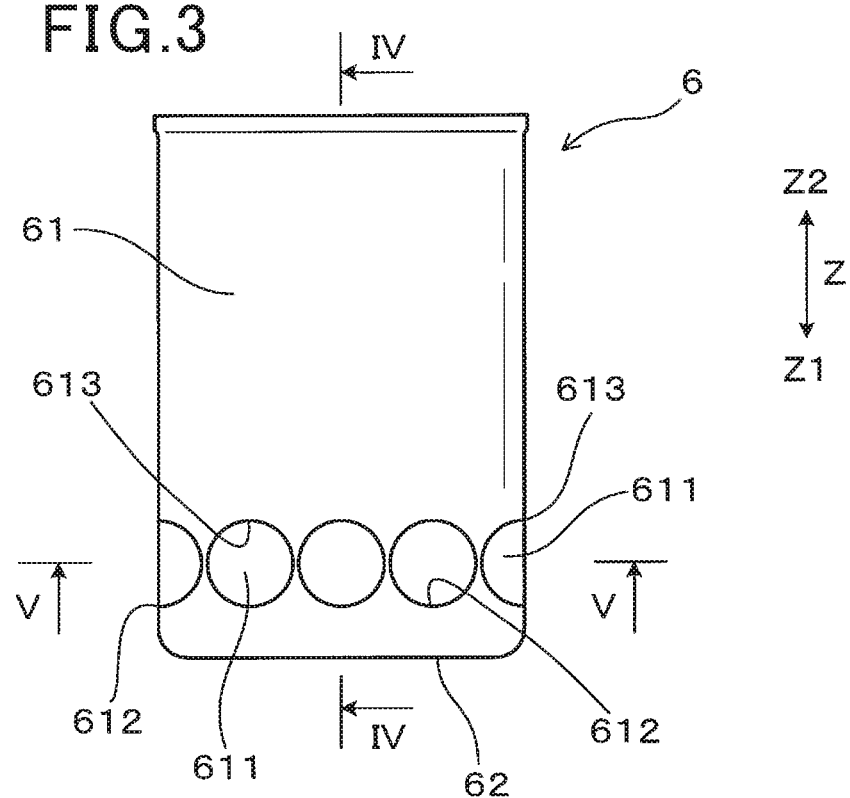
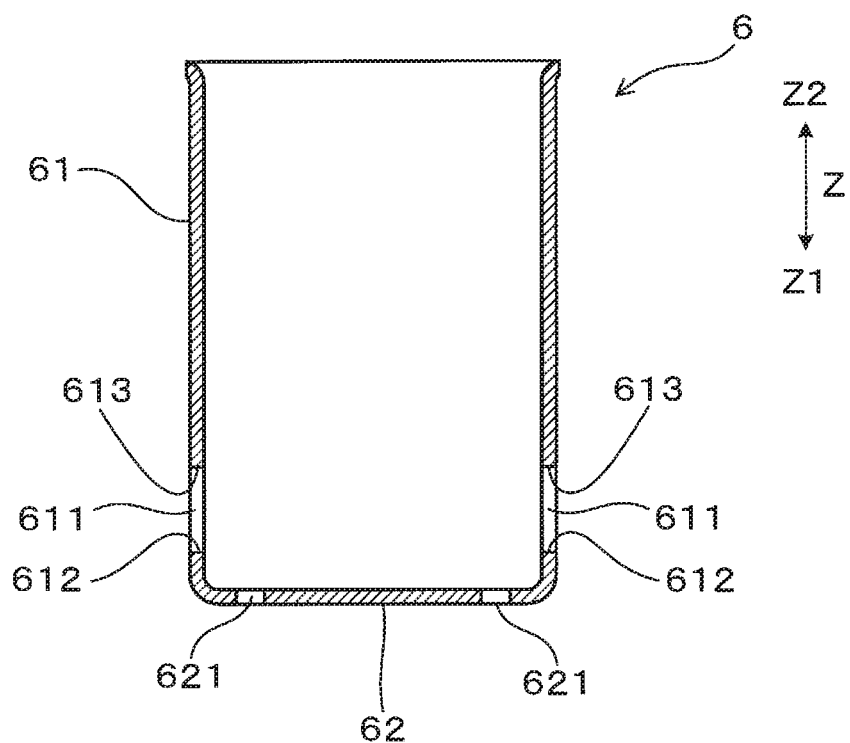

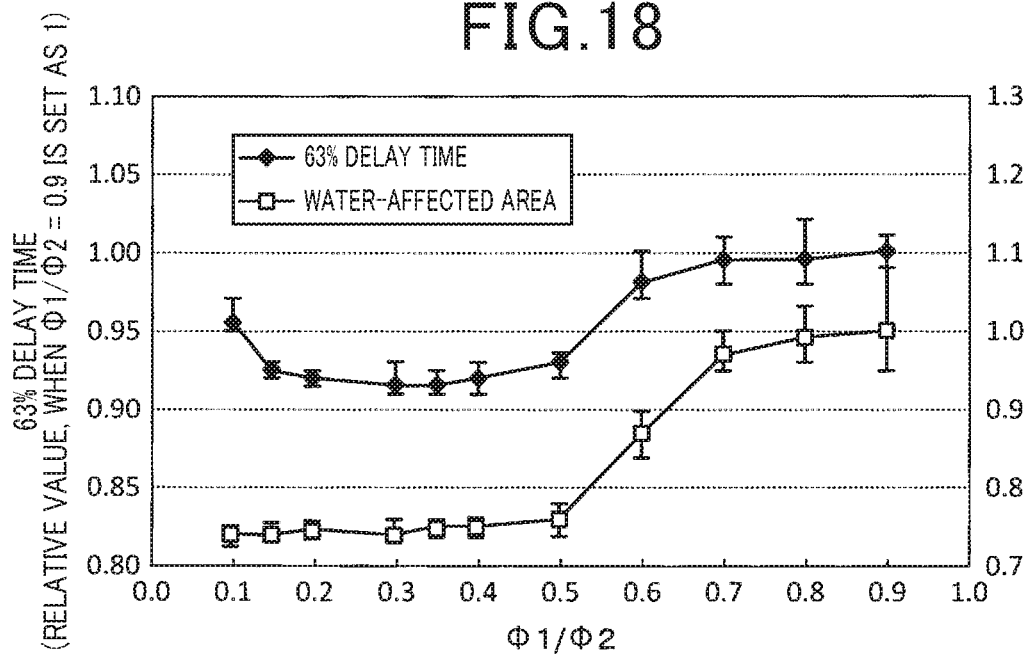
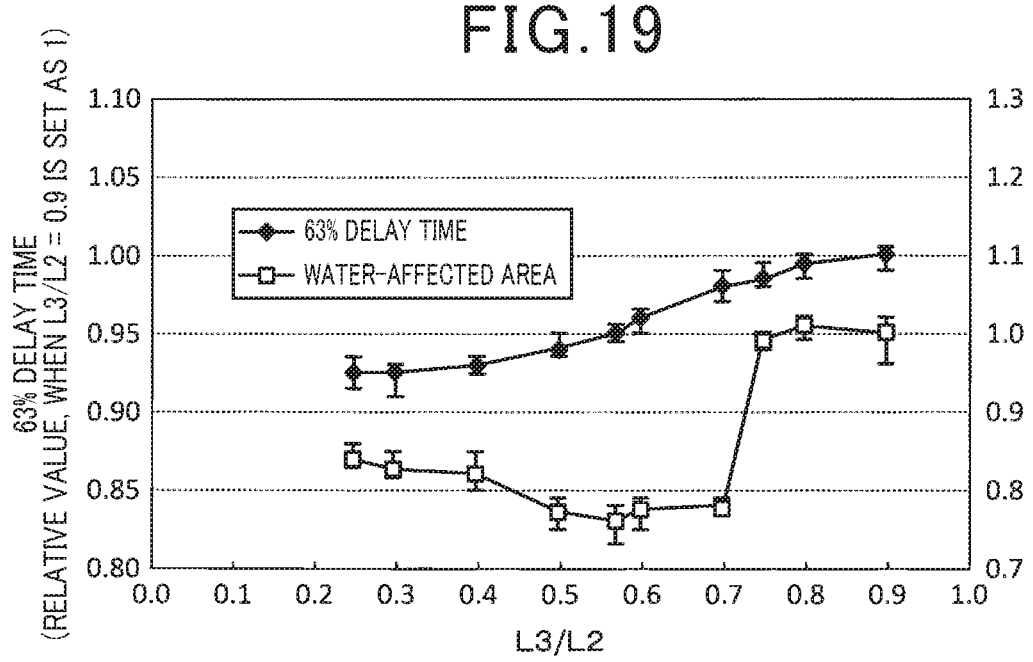

GAS SENSOR

This application is the U.S. national phase of International Application No. PCT/JP2016/076567 filed Sep. 9, 2016, which designated the U.S. and claims priority to JP Patent Application No. 2015-184347 filed Sep. 17, 2015, and JP Patent Application No. 2016-082923 filed Apr. 18, 2016, the entire contents of each of which are hereby incorporated by reference.

TECHNICAL FIELD

The present disclosure relates to a gas sensor for detecting a specific oxygen concentration in a gas that is being measured.

BACKGROUND ART

A gas sensor is known which is disposed in the exhaust system of an internal combustion engine of a vehicle for measuring specific concentrations of oxygen and nitrogen oxide compounds, etc. in gases that are in an exhaust gas which is being measured. For example the gas sensor may be provided with a sensor element for detecting a specific gas concentration in the gas that is being measured, a housing having the sensor element inserted within its inner circumference, and an element cover disposed at the tip end of the housing.

The gas sensor is configured such that the gas that is being measured, such as exhaust gas, comes into contact with the surface of the sensor element. During low-temperature operation, etc., of an internal combustion engine, water condensate, that is produced when water vapor in the exhaust gas becomes condensed, may flow towards the sensor element together with the exhaust gas, and adhere to the surface of the sensor element. In this respect, the sensor element is used under a condition of high temperature, for activating the solid electrolyte material. Hence, a large thermal shock may be applied to the sensor element due to the adhering water condensate, which can produce water-induced cracking.

As a countermeasure against such water-induced cracking, for example a gas sensor has been proposed in PTL 1 which has a two-layer sensor cover, formed of an inner cover (specifically, a first protector) that covers the tip part of a sensor element, which is provided with a gas inflow part, and an outer cover (specifically, a second protector) which is disposed around the periphery of the inner cover. With that gas sensor, gas flow holes are respectively provided in the inner cover and in the outer cover.

CITATION LIST

Patent Literature

[PTL 1] JP 2001-74686 A

SUMMARY OF THE INVENTION

Technical Problem

In the above configuration of a gas sensor, since the gas flow holes provided in the inner cover are positioned sufficiently closer to the tip end of the housing than is the tip of the sensor element, an effect of preventing of water from impinging on the sensor element can be expected. However since the positions of the gas flow holes are excessively far from the tip of the element, there is a risk that there will be a lowering of the responsiveness of the sensor output. That is to say, with the above configuration of a gas sensor, the gas that is being measured, having been introduced into the interior of inner cover, can readily be discharged directly via the gas flow holes that are provided in the base of the inner cover and in the side face, etc., without being detected by the sensor element. As a result there is a risk of lowering of the responsiveness of the sensor output. That is to say, with the above configuration of a gas sensor, it is difficult to both prevent water-induced cracking while also achieving high responsiveness of the sensor output.

It is an objective of the present disclosure to provide a gas sensor which can prevent water-induced cracking and can suppress reduction of responsiveness of the sensor output.

Solution of Problem

A gas sensor (1) according to a first aspect of a technique of the present disclosure includes:

a sensor element (2) which detects a specific gas component concentration in a gas that is being measured;

a housing (3) having the sensor element disposed in the interior thereof and retained therein; and an element cover (4) disposed at an axial-direction tip end (Z1) of the housing;

with a gas introduction part (25) being provided at a tip (21) of the sensor element, for introducing the gas that is being measured into the interior of the sensor element;

and with the element cover having an inner cover (5) formed in a tubular shape having a bottom, disposed to cover the axial-direction tip end of the sensor element, and having an outer cover (6) formed in a tubular shape having a bottom, disposed to form a space (41) that is open to an outer side of the inner cover.

A side (51) of the inner cover is provided with inner-side flow holes (511) for circulating the gas that is being measured, and an inner bottom flow hole (521) is provided in the bottom (52) of the inner cover, for circulating the gas that is being measured.

The inner cover is provided with a tapered-diameter step part (53) that is tapered inwards toward the axial-direction tip end and the inner-side flow holes are disposed closer to an axial-direction base end (Z2) than is the tapered-diameter step part.

Outer-side flow holes (611) are provided in the side (61) of the outer cover, for circulating the gas that is being measured.

A tip position (612) of the outer-side flow holes is disposed closer to the axial-direction tip end than is the bottom of the inner cover.

A distance (L1) between the tip of the sensor element and a base position (513) of the inner-side flow holes, with respect to an axial direction (Z), is less than or equal to 1.6 mm.

Effects of Invention

In a gas sensor according to the present disclosure, a gas introduction part is provided at the tip of a sensor element, for introducing a gas that is being measured, and the sensor element is covered by an element cover that is made up of an inner cover and an outer cover. Furthermore, respective gas flow holes having a prescribed position relationship are provided in the inner cover and in the outer cover, with the inner cover having a tapered-diameter step portion. In particular, a distance L1 in an axial direction between the tip of the sensor element and a base position of inner side face gas flow holes is set as less than or equal to 1.6 mm. As a result, with the above gas sensor, the amount of moisture that impinges on the sensor element can be reduced, while providing a sufficient supply of the gas that is being measured to the gas introduction part that is provided at the tip of the sensor element. Hence with a gas sensor according to the present disclosure, water-induced cracking of the sensor element can be prevented, while suppressing decrease of the sensor output responsiveness. Other operational effects and mechanisms will be described for embodiments in the following, referring to the drawings. It should be noted that the reference numerals shown in parentheses in the claims and in the Solution of Problem indicate correspondence relationships between concrete means that are in the embodiments, as described hereinafter. Hence the description does not limit the technical scope of the present disclosure.

BRIEF DESCRIPTION OF THE DRAWINGS

FIG. 3 is a side view of an outer cover of the first through fourth embodiments.

FIG. 4 is a cross-sectional view taken in a plane through the line IV-IV in FIG. 3.

FIG. 18 is a diagram showing the relationship between $\Phi 1/\Phi 2$ and the 63% response time, and the relationship between $\Phi 1/\Phi 2$ and the water-affected area, in the second experimental example.

FIG. 19 is a diagram showing the relationship between L3/L2 and the 63% response time, and the relationship between L3/L2 and the water-affected area, in the third experimental example.

DESCRIPTION OF THE EMBODIMENTS

First Embodiment

An embodiment of a gas sensor will be described referring to FIGS. 1 to 10. In the following description, "axial-direction tip end" signifies one end of the gas sensor with respect to an axial direction Z, which is the end that is exposed to the gas that is being measured. Furthermore "axial-direction base end" signifies the opposite end.

Figure 1:
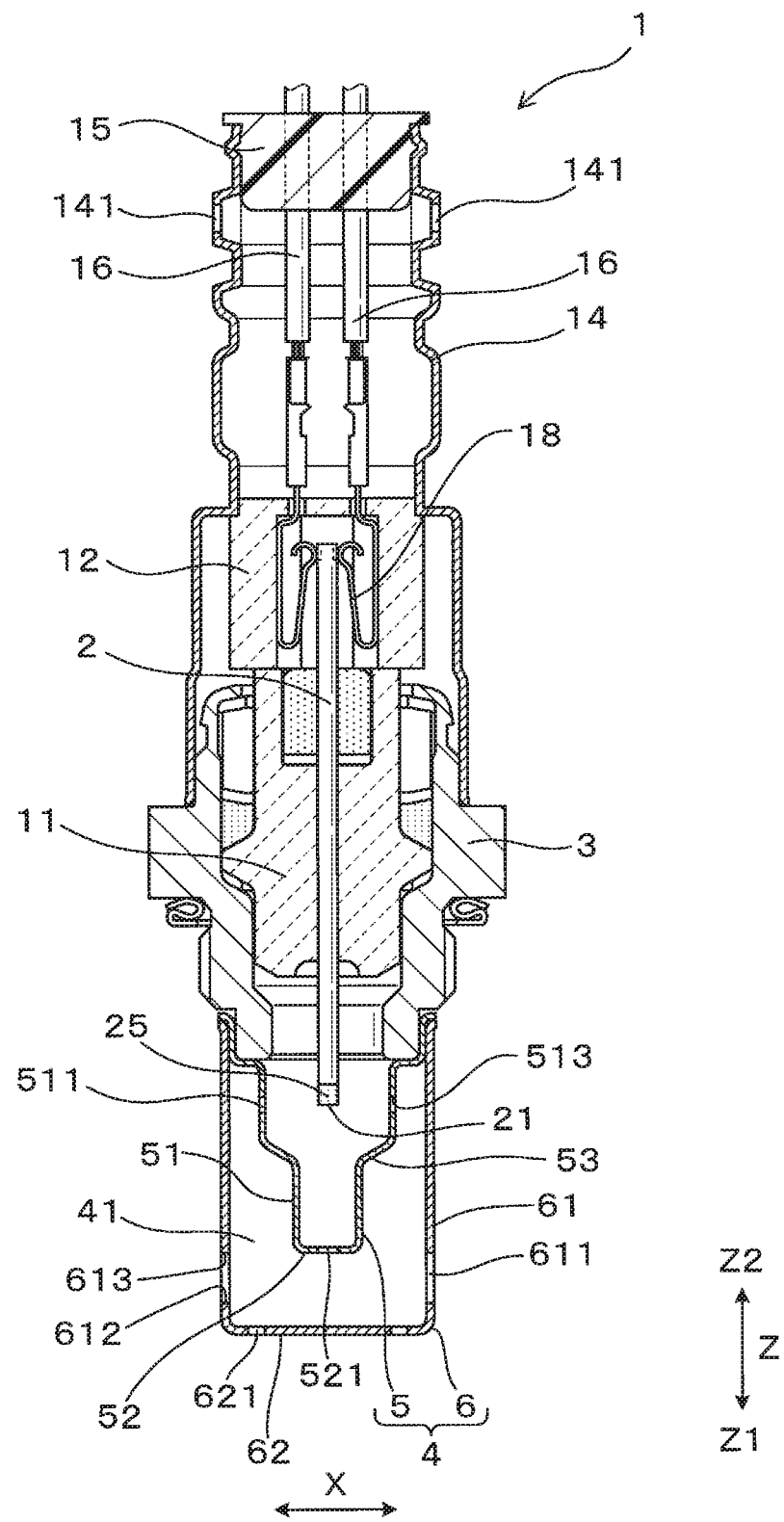
FIG. 1 is a cross-sectional view of a gas sensor according to the first through fourth embodiments.

As shown in FIG. 1, the gas sensor 1 is made up of a sensor element 2 which detects the concentration of a specific gas in the gas that is being measured, a housing 3 which holds the sensor element 2 inserted in its interior, and an element cover 4 that is disposed at the axial-direction tip end Z1 of the housing 3. A gas introduction part 25 is provided at the tip 21 of the sensor element 2, for introducing the gas that is being measured into the interior of the sensor element 2. The element cover 4 has an inner cover 5 and an outer cover 6, with the inner cover 5 being of cylindrical shape with a bottom, and being disposed to cover the edge (hereinafter referred to as the tip of the sensor element 2) of the axial-direction tip end Z1 of the sensor element 2, the outer cover 6 being of cylindrical shape with a bottom, and being disposed with a space 41 at the outside of the inner cover 5.

Figure 2:
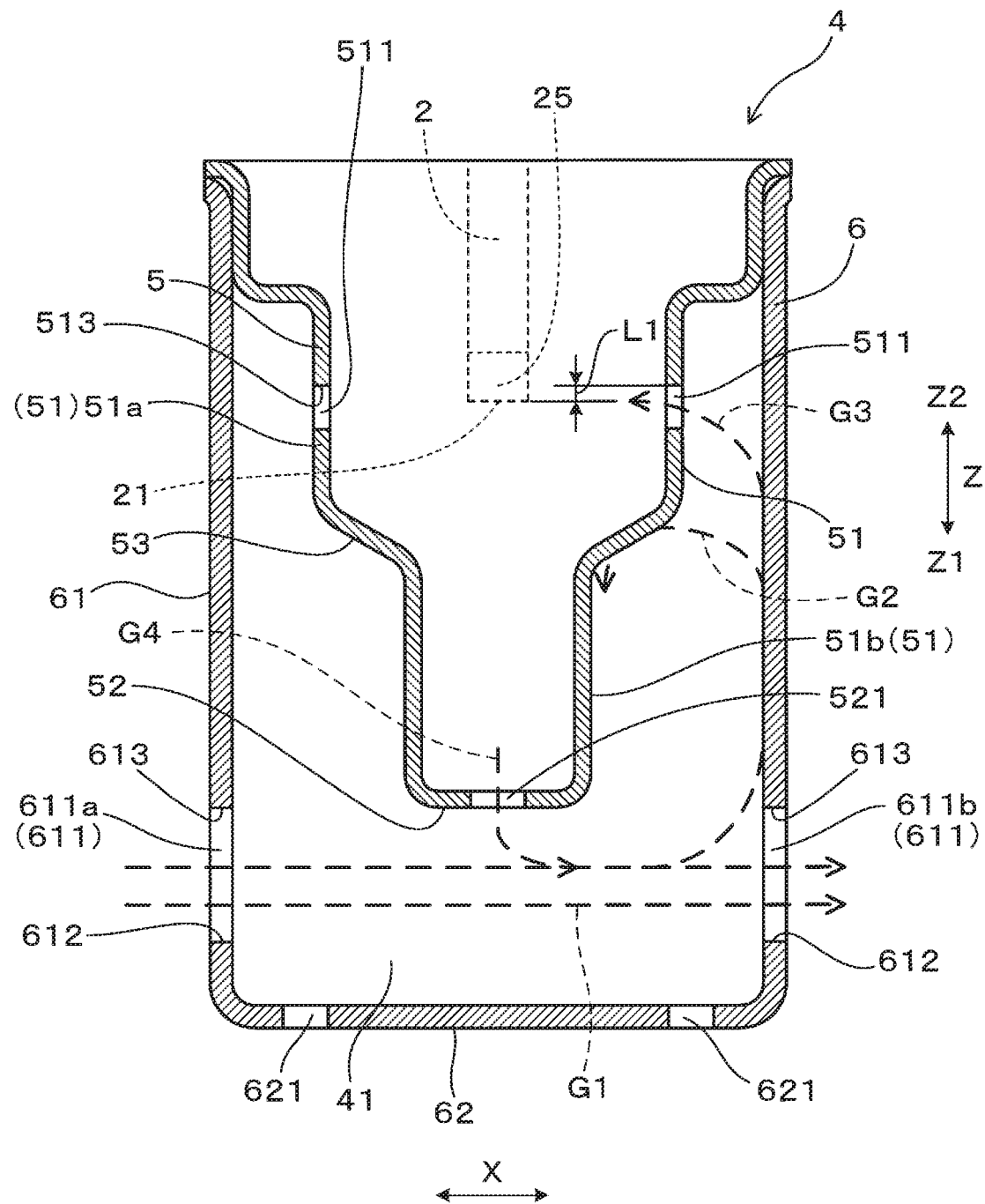
FIG. 2 is a cross-sectional view of a gas sensor element cover of the first embodiment.

As shown in FIGS. 1 and 2, inner-side flow holes 511 through which the gas that is being measured can circulate are formed in the side 51 of the inner cover 5, and an inner bottom flow hole 521 is formed in the bottom 52 of the inner cover 5, through which the gas that is being measured can circulate. A tapered-diameter step part 53 is provided in the inner cover 5, which is tapered in diameter towards the axial-direction tip end Z1, and inner-side flow holes 511 are provided in the inner cover 5, closer to the axial-direction base end Z2 than is the tapered-diameter step part 53. Furthermore, outer-side flow holes 611 are provided in the side 61 of the outer cover 6, through which the gas that is being measured can circulate, with the outer-side flow holes 611 being disposed closer to the axial-direction tip end Z1 than is the bottom 52 of the inner cover 5.

Furthermore with the gas sensor 1, as shown in FIG. 2, the distance L1 along the axial direction Z between the tip 21 of the sensor element 2 and the base position 513 of the inner-side flow holes 511 is made less than or equal to 1.6 mm. It should be noted that as shown in FIG. 2, the position relationship between the tip 21 of the sensor element 2 and the base position 513 of the inner-side flow holes 511 can be arranged such that the tip 21 of the sensor element 2 is closer to the axial-direction tip end Z1 than is the base position 513 of the inner-side flow holes 511. Furthermore although not shown in the diagram, the tip 21 of the sensor element 2 may be disposed closer to the axial-direction base end Z2 than is the base position 513 of the inner-side flow holes 511. That is to say, it is sufficient if the distance L1 between the tip 21 of the sensor element 2 and the base position 513 of the inner-side flow holes 511 is made less than or equal to 1.6 mm. It would be equally possible for either one of the tip 21 of the sensor element 2 or the base position 513 of the inner-side flow holes 511 to be disposed at the axial-direction tip end Z1. In the following, a more detailed description of the gas sensor 1 of the present embodiment will be given.

As shown in FIG. 1, the gas sensor 1 of the present embodiment is a NOx sensor for vehicle use, in an automobile, etc., employed to measure the concentrations of $O_2$ and $NO_x$ in the exhaust gas. The gas sensor 1 has a NOx sensor element as the sensor element 2, which detects the concentration of NOx based on a current that flows between electrodes (not shown in the drawings) or a voltage that is produced between the electrodes, which depend upon the concentration of NOx in the exhaust gas. The sensor element 2 has an elongated plate-shaped form, and includes a gas introduction part 25 that is formed of a porous ceramic material, disposed at the tip 21 with respect to the axial direction Z. The gas that is being measured is introduced into the interior of the sensor element 2 from the gas introduction part 25. Specifically, the gas introduction part 25 can be formed at the surface of the tip of the long plate-shaped sensor element 2, in the axial direction Z. A heater (not shown in the drawing) is provided at the position where the electrodes (not shown in the drawings) of the sensor element 2 are disposed, and the sensor element 2 is heated by electric power supplied to the heater. It should be noted that it would be equally possible for the sensor element 2 to be an A/F sensor element. In that case the gas sensor 1 would be used as an A/F sensor that detects an air-fuel ratio.

In the gas sensor 1, the sensor element 2 is retained inserted inside a first insulator 11. Furthermore the first insulator 11 is retained within the housing 3.

A base end cover 14 is held at the axial-direction base end Z2 of the housing 3, covering the base portion of the axial-direction base end Z2 of the sensor element 2 (hereinafter referred to as the base end portion of the sensor element 2). The base end cover 14 is provided with circulation holes 141, for introducing air. Furthermore the aperture at the axial-direction base end Z2 of the base end cover 14 (base end aperture) is closed by a sealing member 15, being made of a rubber bushing or the like. A plurality of lead members 16 are inserted through the sealing member 15, connected externally.

A second insulator 12 is disposed in the interior of the base end cover 14, covering the base part of the sensor element 2. Metal terminals 18 are disposed in the second insulator 12, connected to the lead members 16. The metal terminals 18 are in contact with the electrode terminals of the sensor element 2, for providing electrical conduction.

As shown in FIGS. 1 and 2, an element cover 4 is provided at the axial-direction tip end Z1 of the housing 3, for protecting the sensor element 2. The element cover 4 is made of an inner cover 5 and an outer cover 6, where the inner cover 5 is formed with a substantially cylindrical shape and having a bottom, and covers the tip 21 of the sensor element 2, while the outer cover 6 is formed with a substantially cylindrical shape and having a bottom, and is open to the exterior of the inner cover 5, separated by a space 41. The inner cover 5 is attached at the axial-direction tip end Z1 of the housing 3. Furthermore the outer cover 6 is attached at the axial-direction base end Z2 of the inner cover 5. It should be noted that it is not essential for the outer cover 6 to be formed with a substantially cylindrical shape having a bottom, and it would be equally possible for the outer cover 6 to be formed with an elliptical tubular shape having a bottom, or a polygonal tubular shape having a bottom. Examples of such a polygonal tubular shape include a triangular tubular shape having a bottom, a square tubular shape having a bottom, a hexagonal tubular shape having a bottom, etc.

As shown in FIGS. 2 to 6, the outer cover 6 has a cylindrical-shape side 61, and a bottom 62 which closes the axial-direction tip end Z1. A plurality of outer-side flow holes 611 are provided circumferentially at prescribed spacings in the side 61 of the outer cover 6. These outer-side flow holes 611 are circular-shaped holes and are of respectively identical diameter to each other, and are formed in the side 61 of the outer cover 6 at the axial-direction tip end Z1. Furthermore the outer-side flow holes 611 are disposed coaxial in a plane at right angles to the axial direction Z, concentric with the central axis of the gas sensor 1. That is to say, the outer-side flow holes 611 are each at the same position along the axial direction Z.

Figure 5:
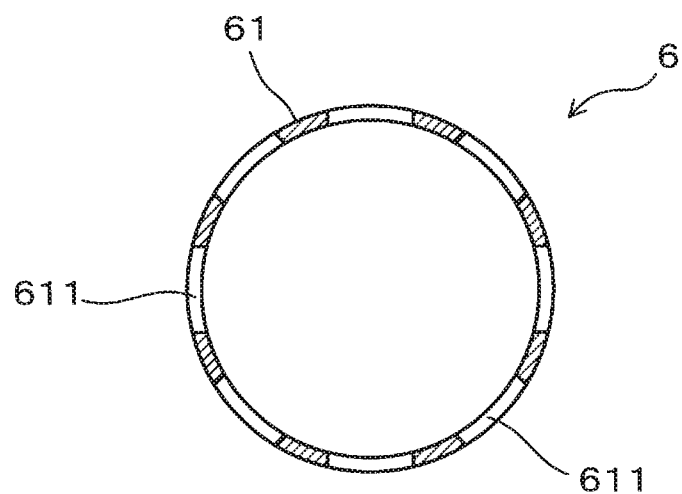
FIG. 5 is a cross-sectional view taken in a plane through the line V-V in FIG. 3.
Figure 6:
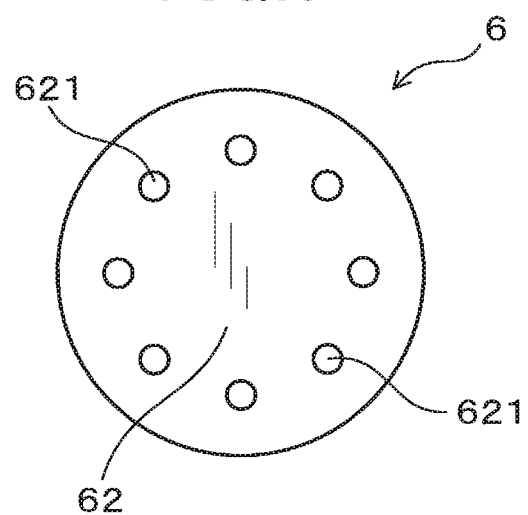
FIG. 6 is a plan view of a bottom face of the outer cover of the first through fourth embodiments.
Figure 7:
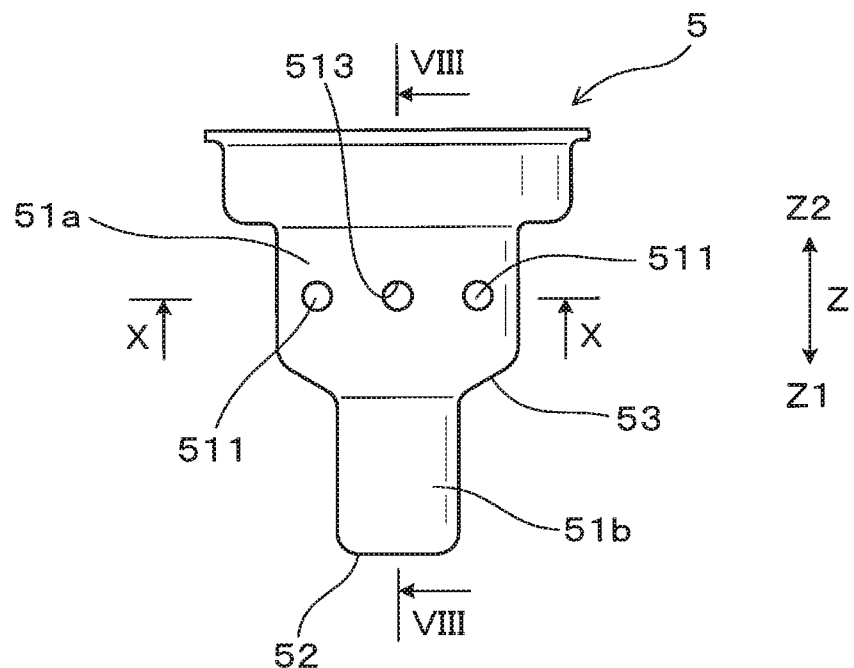
FIG. 7 is a side view of the inner cover of the first through fourth embodiments.
Figure 8:
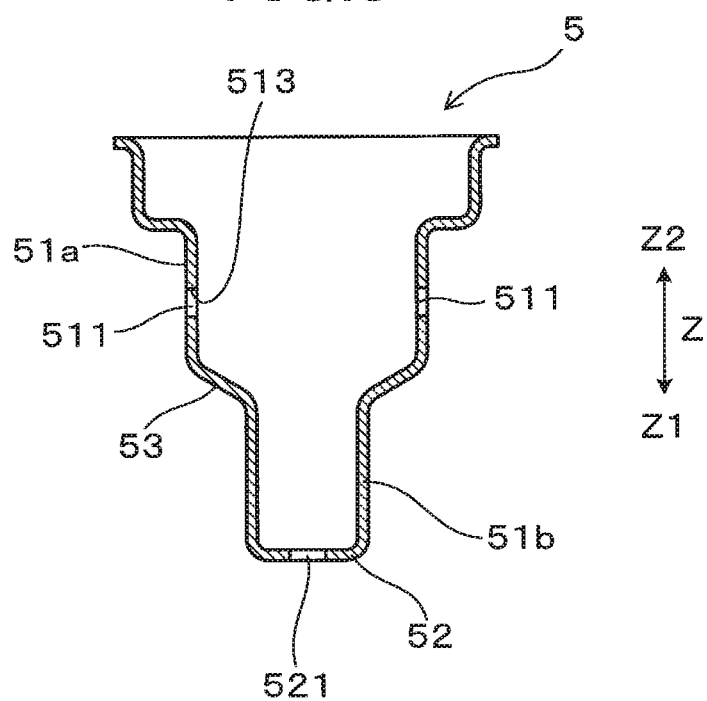
FIG. 8 is a cross-sectional view taken in a plane through the line VIII-VIII in FIG. 7.
Figure 9:
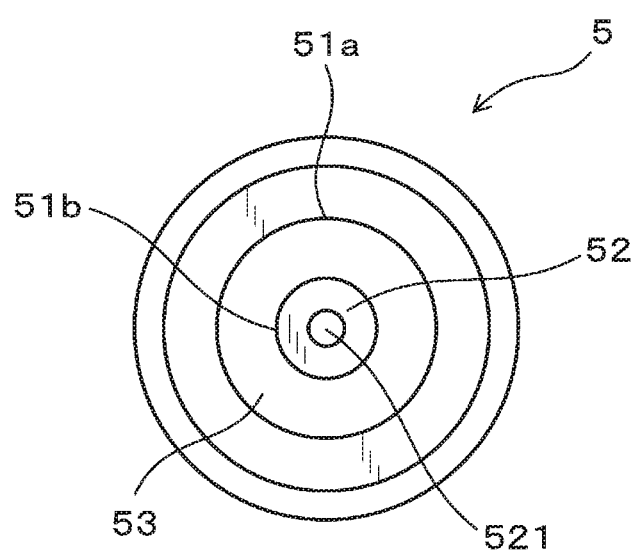
FIG. 9 is a plan view of a bottom face of the inner cover of the first embodiment.
Figure 10:
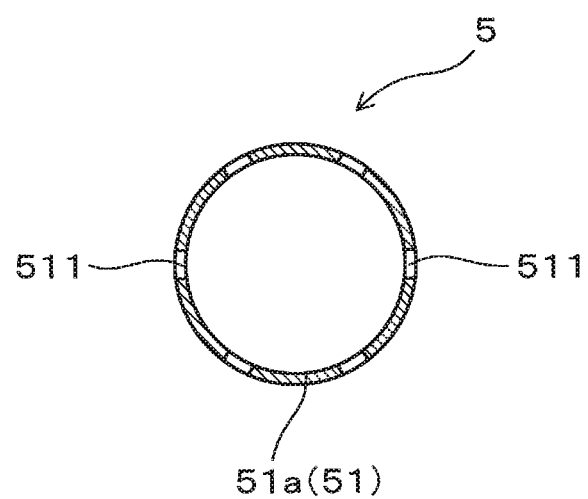
FIG. 10 is a cross-sectional view taken in a plane through the line X-X in FIG. 7.

A plurality of outer bottom flow holes 621 are provided in the bottom 62 of the outer cover 6. These outer bottom flow holes 621 are circular-shaped holes and are of respectively identical diameter to each other, and open at prescribed spacings from one another, disposed concentrically with respect to the center position of the disk-shaped bottom 62 of the outer cover 6. In FIGS. 5 and 6, a direction at right angles to the surface of the paper of the drawing is the axial direction Z, while the side shown in the drawings is the axial-direction tip end Z1, and the rear (not shown in the drawings) is the axial-direction base end Z2. This is also true for FIGS. 9 and 10, described hereinafter. The outer bottom flow holes 621 and the outer-side flow holes 611 could be formed other than as the circular-shaped holes described above, i.e., these could be changed, as appropriate, to polygonal-shaped holes such as triangular holes, rectangular holes, hexagonal holes, or elliptical holes, or holes of unstructured shape, etc.

As shown in FIGS. 2 and 7 to 10, the inner cover 5 has the following parts, as seen successively from the axial-direction base end Z2. Specifically, the inner cover 5 has a first side surface 51a which extends with unchanged diameter along the axial direction Z, a tapered-diameter step part 53 whose diameter tapers towards the axial-direction tip end Z1, a second side surface 51b which extends with unchanged diameter along the axial direction Z, and a bottom 52 which closes the axial-direction tip end Z1. A plurality of inner-side flow holes 511 are formed in the first side surface 51a of the inner cover 5, positioned closer to the axial-direction base end Z2 than is the tapered-diameter step part 53. The inner-side flow holes 511 are circular-shaped holes and are of respectively identical diameter to each other. The inner-side flow holes 511 are disposed concentrically with respect to the central axis of the gas sensor 1, in a plane that is at right angles to the axial direction Z. That is to say, the inner-side flow holes 511 are each at the same position along the axial direction Z. An inner bottom flow hole 521 is provided in the bottom 52 of the inner cover 5. The inner bottom flow hole 521 also is a circular-shaped hole. The inner bottom flow hole 521 and the inner-side flow holes 511 are not limited to being circular-shaped holes as described above, and could be changed, as appropriate, to polygonal-shaped holes such as triangular holes, rectangular holes, hexagonal holes, or elliptical holes, or holes of unstructured shape, etc.

In the element cover 4, as shown in FIG. 2, the tip position of 612 of the outer-side flow holes 611 are disposed closer to the axial-direction tip end Z1 than is the bottom 52 of the inner cover 5. Furthermore with the present embodiment, the base position 613 of the outer-side flow holes 611 is disposed identically to the position of the bottom 52 of the inner cover 5, with respect to the axial direction Z. Furthermore with the gas sensor 1, as shown in FIGS. 1 and 2, the distance L1 along the axial direction Z between the tip 21 of the sensor element 2 in the gas introduction part 25 and the base position 513 of the inner-side flow holes 511 is made less than or equal to 1.6 mm.

The operational aspects and mechanisms of the gas sensor 1 of the present embodiment will now be described. As shown in FIGS. 1 and 2, with the gas sensor 1, a sensor element 2 having a gas introduction part 25 at a tip thereof, for introducing a gas that is being measured, is covered by an element cover 4 which is formed of an inner cover 5 and an outer cover 6. The directions of flow of the exhaust gas, which is the gas that is being measured, are indicated by the broken-line arrows G1 to G4 in FIG. 2.

As shown by the broken-line arrow G1 in FIG. 2, the exhaust gas is introduced to the interior of the gas sensor 1 through a flow hole 611a, which is at the farthest upstream position of the plurality of outer-side flow holes 611 provided in the side 61 of the outer cover 6, with respect to the flow direction of the exhaust gas. The exhaust gas is subsequently discharged to the exterior through a flow hole 611b, which is at the farthest downstream position. At that time, a part of the exhaust gas which has been introduced into the space 41 between the inner cover 5 and the outer cover 6 collides with the inner side face of the outer cover 6, as shown by the broken-line arrows G2, G3. The exhaust gas then is drawn upward towards the axial-direction base end Z2. However with the gas sensor 1 of the present embodiment, the inner cover 5 has a tapered-diameter step part 53 as described above. For that reason, as shown by the broken-line arrow G2, a part of the moisture contained in the exhaust gas that is being drawn upward collides with the tapered-diameter step part 53. As a result, that moisture is returned towards the axial-direction tip end Z1, and is discharged from the flow hole 611b. In that way, with the gas sensor 1, water is prevented from impinging on the sensor element 2 (water-induced cracking of the sensor element 2 can be prevented).

On the other hand as shown by the broken-line arrow G3, part of the exhaust gas that is being drawn upward is introduced to the interior of the inner cover 5 through the inner-side flow holes 511 that are provided in the side of the inner cover 5. In this respect, the distance L1 along the axial direction Z between the tip 21 of the sensor element 2 in the gas introduction part 25 and the base position 513 of the inner-side flow holes 511 is set to be less than or equal to 1.6 mm. For that reason, the region of contact between the sensor element 2 and the moisture that is introduced into the interior of the inner cover 5 through the inner-side flow holes 511 can be made small. As a result, with the gas sensor 1 of the present embodiment, the amount of moisture damage to the sensor element 2 can be kept small, and water-induced cracking of the sensor element 2 can be prevented. Furthermore as shown by the broken-line arrow G3, the exhaust gas flows past the vicinity of the tip 21 of the sensor element 2, which is provided with the gas introduction part 25. Moreover as shown by the broken-line arrow G4, the exhaust gas is discharged from the inner bottom flow hole 521. As a result, with the gas sensor 1 of the present embodiment, the gas exchangeability near the tip 21 of the sensor element 2, provided with the gas introduction part 25, becomes good, and a decrease in the responsiveness of the sensor output signal can be suppressed.

Furthermore as shown in FIG. 2, the base position 613 of the outer-side flow holes 611 and the bottom 52 are at the same position with respect to the axial direction Z. The base position 613 of the outer-side flow holes 611 is preferably disposed in that way, at the same position as the bottom 52 of the inner cover 5, or disposed closer to the axial-direction base end Z2 than is the bottom 52. In that case as shown by the broken-line arrow G4, an increase can be achieved in the flow rate of the exhaust gas that is discharged to the exterior (space 41) through the inner bottom flow hole 521 provided in the bottom 52 of the inner cover 5. As a result, with the gas sensor 1 the present embodiment, the gas exchangeability in the interior of the inner cover 5 is increased, and the responsiveness of the sensor output signal is further enhanced.

Furthermore as shown in FIGS. 1 to 5, outer bottom flow holes 621 are preferably provided in the bottom 62 of the outer cover 6. In that case, if for example the axial-direction tip end Z1 of the gas sensor 1 is disposed in the exhaust gas passage, a negative pressure can be produced in the interior of the outer cover 6, by means of difference in flow speeds between the exhaust gas that flows to the exterior of the outer cover 6 and the exhaust gas that flows in the interior of the outer cover 6. More specifically, due to the difference between the flow speed of exhaust gas that flows closer to the axial-direction tip end Z1 than is the bottom 62 of the outer cover 6 and the flow speed of exhaust gas that flows in the interior of the outer cover 6, a negative pressure can be achieved in the interior of the outer cover 6. As a result, the flow speed of the gas in the interior of the outer cover 6 can be increased. Hence with the gas sensor 1 the present embodiment, the gas exchangeability can be increased not only in the interior of the outer cover 6 but also in the interior of the inner cover 5. The responsiveness of the sensor output is thereby further enhanced. Moreover in this case, water is discharged without collecting on the bottom 62 of the outer cover 6. As a result, the amount of moisture that impinges on the sensor element 2 can be further reduced. Due to this, water-induced cracking can be further prevented, with the gas sensor 1 of the present embodiment.

With the gas sensor 1 of the present embodiment as described above, water-induced cracking of the sensor element 2 can be prevented, and lowering of the responsiveness of the sensor output can be suppressed.

Second Embodiment

A second embodiment of a gas sensor will next be described, in which a ratio $\Phi 1/\Phi 2$ of the external diameter $\Phi 1$ of the inner cover 5 to the internal diameter $\Phi 2$ of the outer cover 6 was adjusted. Designation symbols used for the second and subsequent embodiments are the same as those used for the first embodiment, and the constituent elements are the same as those of the first embodiment, unless otherwise indicated.

Figure 11:
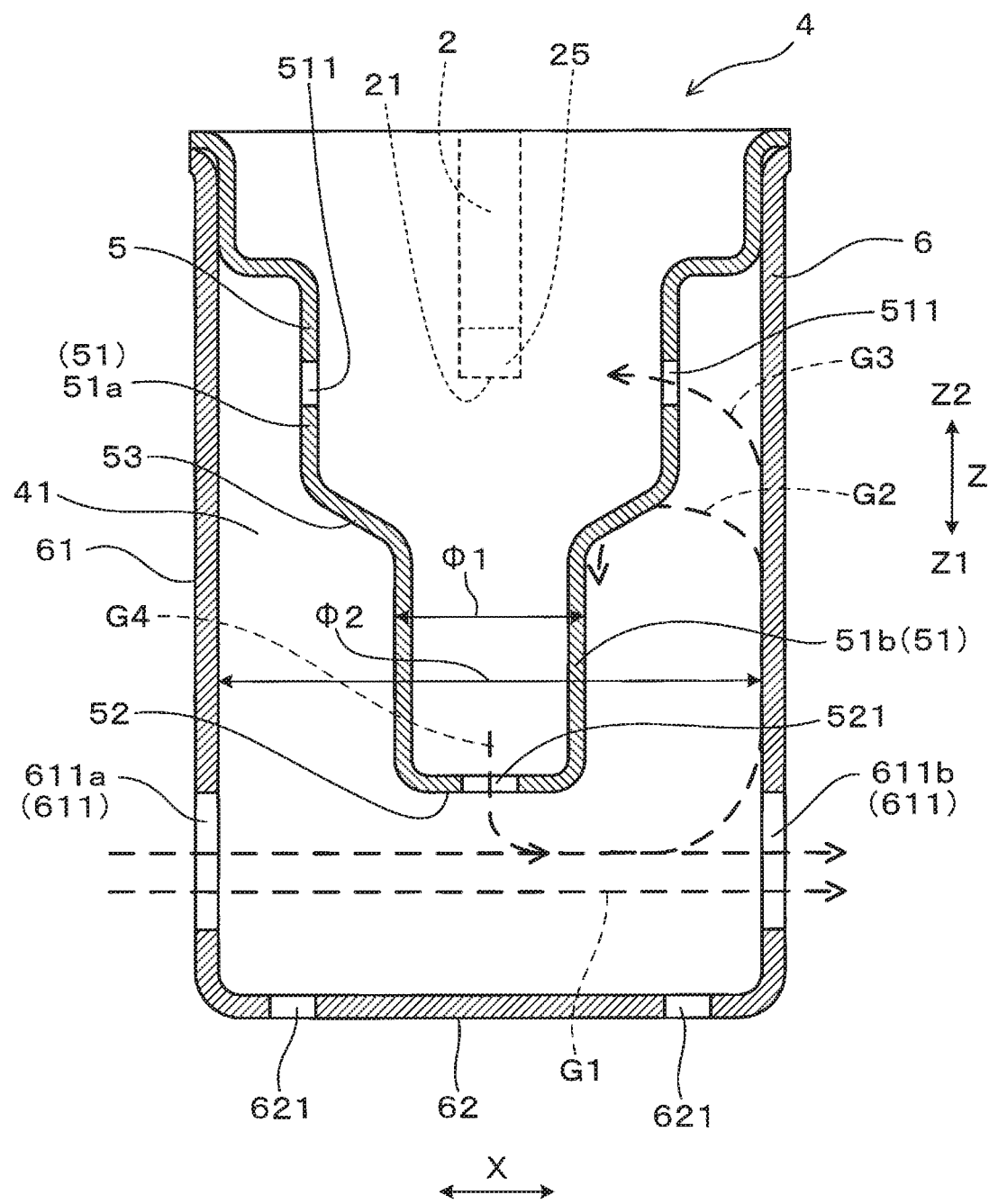
FIG. 11 is a cross-sectional view of a sensor element cover of the second embodiment.

With the gas sensor 1 of the present embodiment as shown in FIG. 11, in a part of the inner cover 5 that is closer to the axial-direction tip end Z1 than is the tapered-diameter step part 53 of the inner cover 5, the external diameter $\Phi1$ of the inner cover 5 and the internal diameter $\Phi2$ of the outer cover 6 satisfy the following expression [1]:

$$0.15 \leq \Phi1/\Phi2 \leq 0.5 \qquad [1]$$

Here, the region that is closer to the axial-direction tip end Z1 than is the tapered-diameter step part 53 does not include the tapered-diameter step part 53 itself.

When the external diameter $\Phi1$ of the inner cover 5 and the internal diameter $\Phi2$ of the outer cover 6 satisfy the expression [1] above, an appropriate amount of clearance is provided between the inner cover 5 and the outer cover 6 in the radial direction X of the gas sensor 1. For that reason, as shown by the broken-line arrow G2 in FIG. 11, the moisture in the exhaust gas that is being drawn upward becomes readily returned to the axial-direction tip end Z1 by the tapered-diameter step part 53. As a result with the gas sensor 1 of the present embodiment, the amount of moisture affecting the sensor element 2 can be further reduced, and water-induced cracking can be further prevented. Furthermore if the above expression [1] is satisfied, then as shown by the broken-line arrow G3, the flow speed of the exhaust gas that is introduced to the interior of the inner cover 5 from the inner-side flow holes 511 and flows close to the tip 21 of the sensor element 2 becomes further increased. Moreover, since it is rendered possible to avoid making the area of the bottom 52 of the inner cover 5 small, excessive reduction of the size of the inner bottom flow hole 521 can be prevented. As a result, with the gas sensor 1 of the present embodiment, lowering of the flow rate of the exhaust gas that is discharged from the inner bottom flow hole 521 (broken-line arrow G4) can be prevented. From the above aspects too, with the gas sensor 1 of the present embodiment, the responsiveness of the sensor output can be further enhanced.

With the present embodiment, the above effects can be achieved if the element cover 4 has a portion which satisfies the above expression [1], and is closer to the axial-direction tip end Z1 than is the tapered-diameter step part 53. Preferably, the predetermined expression [1] should be satisfied for the element cover 4 over the entire region that is closer to the axial-direction tip end Z1 than is the tapered-diameter step part 53. In that case, the amount of moisture affecting the sensor element 2 can be further diminished, and the responsiveness of the sensor output can be further enhanced. It should be noted that with the gas sensor 1 of the present embodiment, moreover, since the same configuration can be used as for the first embodiment, the same operational effects are obtained as for the first embodiment.

Third Embodiment

A third embodiment of a gas sensor will next be described in which adjustment is performed of the ratio (L3/L2), where L3 is the total length of the tapered-diameter step part 53 and the part of the inner cover 5 that is closer to the axial-direction tip end Z1 than is the reduced-diameter stepped part 53 and L2 is the total length of the inner cover 5. In the gas sensor 1 of the present embodiment as shown in FIG. 12, the total length L3 of the length of the tapered-diameter step part 53 and the part of the inner cover 5 that is closer to the axial-direction tip end Z1 than is the tapered-diameter step part 53, with respect to the axial direction Z, and the total length L2 of the inner cover, satisfy the following expression [2]:

$$0.5 \leq L3/L2 \leq 0.7 \qquad [2]$$

Figure 12:
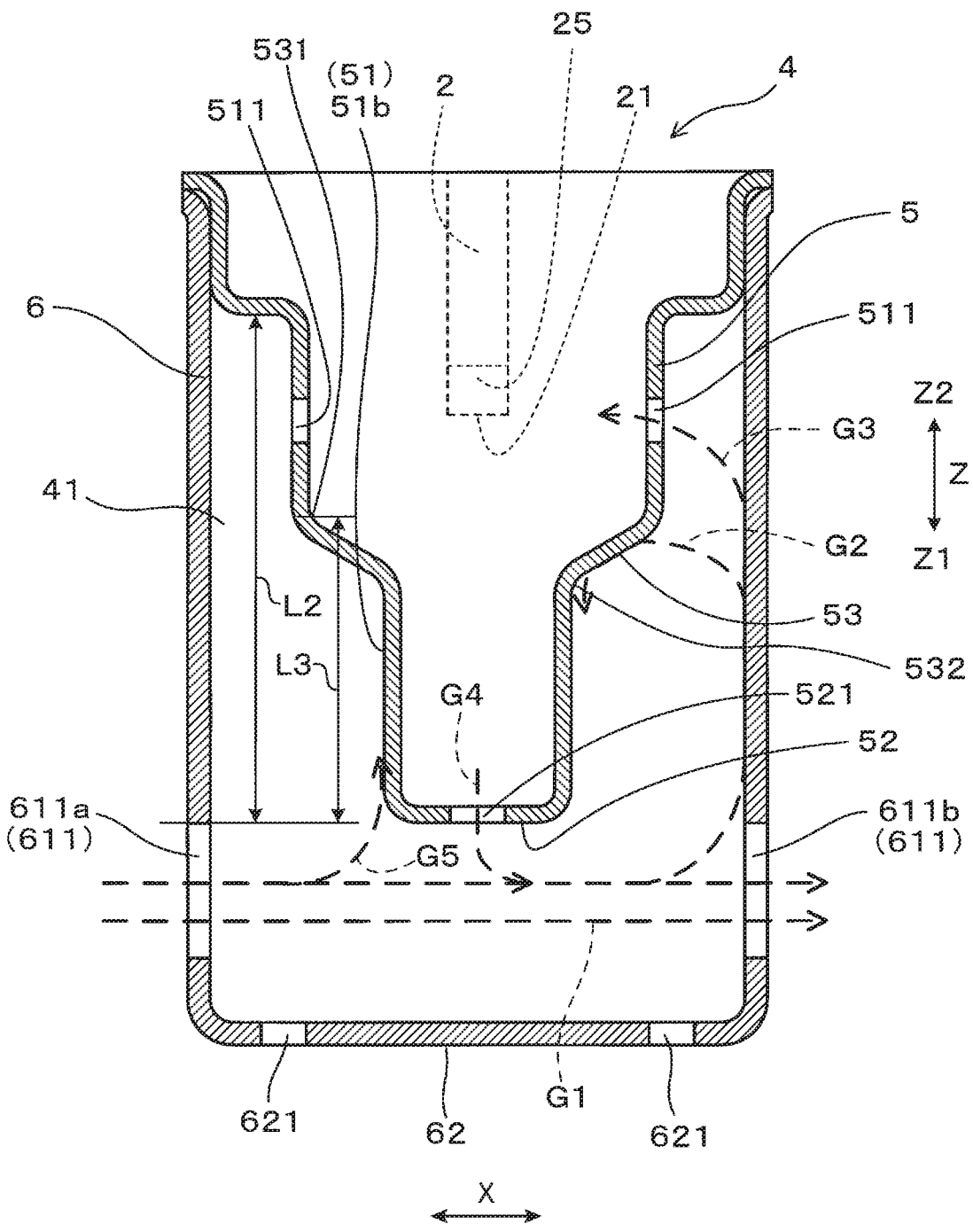
FIG. 12 is a cross-sectional view of a sensor element cover of the third embodiment.

As shown in FIG. 12, the total length L2 of the inner cover 5 is the length along the axial direction Z of the region of the inner cover 5 that corresponds to the space 41 formed between the inner cover 5 and the outer cover 6. Furthermore the length of the tapered-diameter step part 53 is the length along the axial direction Z from the tapered-diameter start part 531 to the tapered-diameter end part 532. The length of the part of the inner cover 5 that is closer to the axial-direction tip end Z1 than is the tapered-diameter step part 53 is the length along the axial direction Z from the tapered-diameter end part 532 to the bottom 52 of the inner cover 5, not including the length of the tapered-diameter step part 53. Hence, the above total length L3 is the length, with respect to the axial direction Z, of the part of the inner cover 5 from the tapered-diameter start part 531 of the tapered-diameter step part 53 to the bottom 52 of the inner cover 5.

When the above prescribed relationship (expression [2]) between the length L2 and the length L3 is satisfied as described above, then an appropriate clearance is provided between the inner cover 5 and the outer cover 6 along the axial direction Z of the gas sensor 1. As a result as shown by the broken-line arrow G2 in FIG. 12, even when the moisture that is contained in the exhaust gas collides with the inner wall (inner side) of the outer cover 6 and becomes drawn upward toward the axial-direction base end Z2, the moisture is readily returned toward the axial-direction tip end Z1, due to the tapered-diameter step part 53. Furthermore as shown by the broken-line arrow G5, when the moisture contained in the exhaust gas that has flowed in through the outer-side flow holes 611 collides with the second side surface 51b of the inner cover 5, the moisture becomes drawn upward toward the axial-direction base end Z2. However, if the above prescribed relationship (expression [2]) is satisfied, the amount of moisture that collides with the second side surface 51b is reduced. As a result, the amount of moisture that is drawn upward toward the axial-direction base end Z2 becomes reduced. Due to this, with the gas sensor 1 of the present embodiment, the amount of moisture that impinges on the sensor element 2 can be further reduced, and water-induced cracking can be further prevented.

Furthermore if the above prescribed relationship (expression [2]) is satisfied, the volume of the interior of the inner cover 5 can be made small. For that reason, an increase is obtained in the flow speed of the exhaust gas that flows into the interior of the inner cover 5 from the inner-side flow holes 511 and flows close to the tip 21 of the sensor element 2. The responsiveness of the sensor output of the gas sensor 1 of the present embodiment thereby becomes further enhanced.

With the gas sensor 1 of the present embodiment, since the same configuration can be used as for the first and second embodiments, the same operational effects can be obtained as for the first and second embodiments. It is most preferable to combine the configurations of the first to third embodiments. That is to say, it is most preferable that the element cover 4 of the gas sensor 1 satisfies the following conditions [a] to [c]:

[a]: The distance L1 between the tip 21 of the sensor element 2 and the base position 513 of the inner-side flow holes 511 in the Z-axis direction is less than or equal to 1.6 mm.

[b]: In the part of the inner cover 5 that extends from the tapered-diameter step part 53 to the axial-direction tip end Z1, the outer diameter Φ1 of the inner cover 5 and the inner diameter Φ2 of the outer cover 6 satisfy the expression [1] (0.15≤Φ1/Φ2≤0.5).

[c]: The sum L3 of the lengths of the tapered-diameter step part 53 and the part of the inner cover 5 that extends from the tapered-diameter step part 53 to the axial-direction tip end Z1 and the total length L2 of the inner cover 5 satisfy the expression [2] (0.5≤L3/L2≤0.7).

In that case, water-induced cracking of the sensor element 2 can be further prevented, and the responsiveness of the sensor output can be further increased.

First Experimental Example

In a first experimental example, the responsiveness of the sensor output and the amount of moisture impinging on the sensor element 2 were evaluated for a plurality of gas sensors, each being as shown for the first embodiment, having respectively different values of the distance L1 between the tip 21 of the sensor element 2 and the base position 513 of the inner-side flow holes 511 in the Z-axis direction. The first embodiment has been described for the case of a gas sensor (NOx sensor) having a NOx sensor element, however with the present experimental example and subsequent experimental examples, gas sensors (A/F sensors) having A/F sensor elements were used, and were evaluated based on responsiveness to A/F ratio. The reason for this is that an A/F sensor is more strongly affected by changes in the element cover 4 than is a NOx sensor. Apart from differences in the type of the sensor element 2, the configuration of a gas sensor used in the present experimental example is the same as for the first embodiment. Unless otherwise indicated, the reference symbols used for the present experimental example and subsequent experimental examples designate the same elements as for the first embodiment above.

[63% Response Time (T63)]

Figure 13:
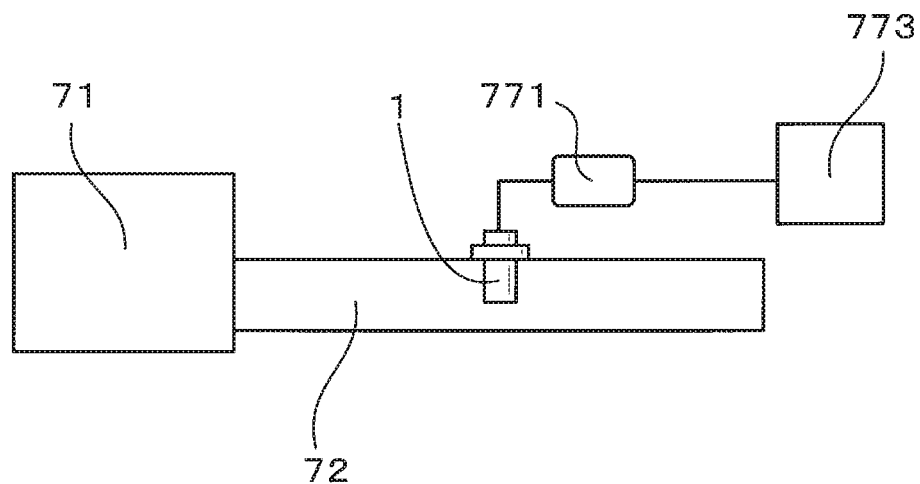
FIG. 13 is a conceptual diagram of a method of measuring sensor response time, in the first through third experimental examples.

The responsiveness of the sensor output was evaluated as described in the following by measuring the 63% response time. Specifically, firstly as shown in FIG. 13, the gas sensor that is the object of the experiment is attached to an exhaust pipe 72 that is coupled to a diesel engine 71. Next, a heater (not shown in the drawings) that is built into the sensor element 2 of the gas sensor 1 is heated, and the gas sensor 1 is operated by applying a voltage between electrodes (not shown in the drawings) that are built into the sensor element 2 (see FIG. 1). Furthermore as shown in FIG. 13, exhaust gas is caused to flow in the exhaust pipe 72 at a gas flow speed of 15 m/s by operating the diesel engine 71. The output from the gas sensor 1 was measured as time elapsed, by a computer 773 that was externally connected via a detection circuit 771. The time that elapsed until the A/F ratio changed from 30 to 40 was measured as the time (63% response time) required for the gas sensor output to change by 63%. In the present experimental example, the 63% response time was measured (see FIG. 2) for a plurality of gas sensors 1 having respectively different values of the distance L1 between the tip 21 of the sensor element 2 and the base position 513 of the inner-side flow holes 511 in the Z-axis direction. Next, setting the 63% response time of the gas sensor for which the distance L1 is 0 mm (L1=0 mm) as 1, the values of the 63% response times of the other gas sensors were expressed as relative values with respect to 1. The results are as shown in FIG. 17, described hereinafter.

[Water-Affected Area]

Figure 14:
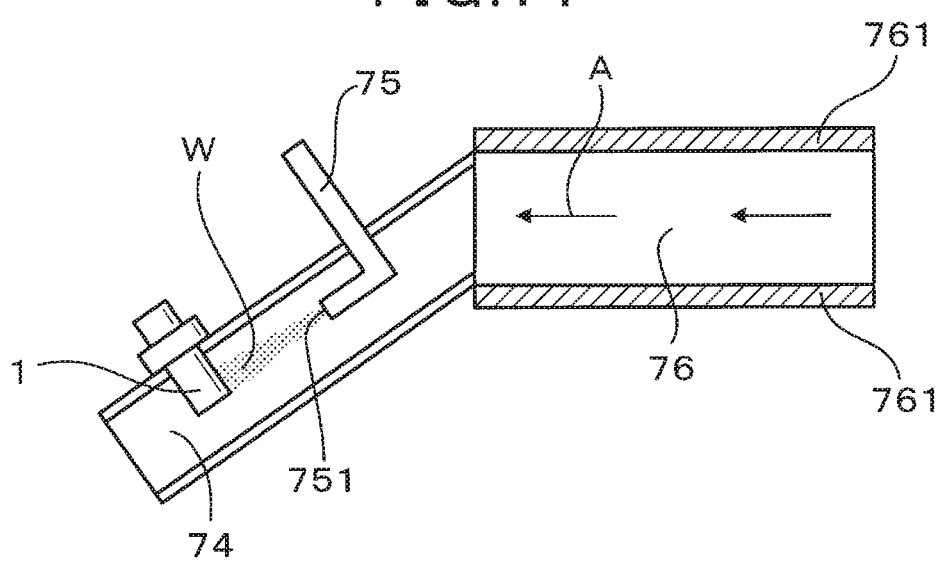
FIG. 14 is a conceptual diagram of a method of measuring a water-affected area, in the first through third experimental examples.
Figure 15A:
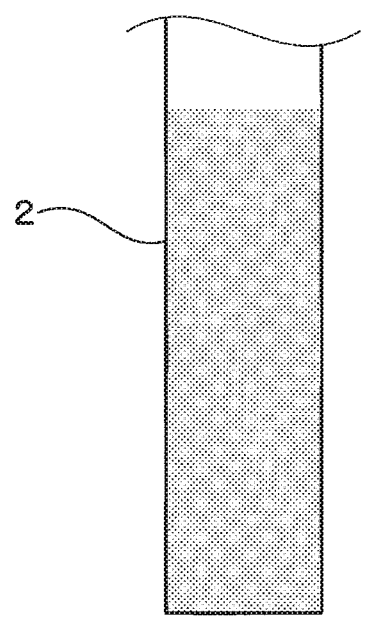
FIG. 15A is a side view of a sensor element that is coated with carbon, in the first experimental example.
Figure 15B:
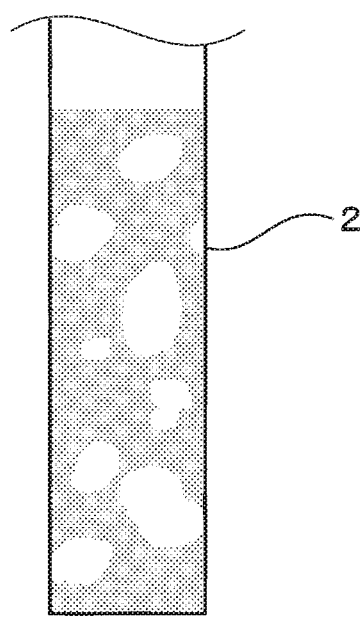
FIG. 15B is a side view of a sensor element after being wetted, in the first experimental example.
Figure 16A:
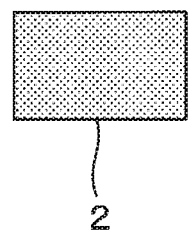
FIG. 16A is a tip view of a sensor element that is coated with carbon, in the first experimental example.
Figure 16B:
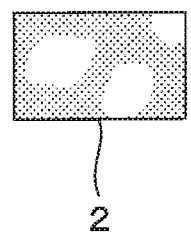
FIG. 16B is a tip view of a sensor element after being wetted, in the first experimental example.

As described in the following, the amount of moisture that impinges on the sensor element 2 was evaluated by measuring the water-affected area. Firstly, the sides and the tip face of the plate-shaped sensor element 2 were coated with carbon, to thereby render the sensor element 2 dark in color (see FIGS. 15A and 16A). Using this sensor element 2, a gas sensor 1 having the same configuration as for the first embodiment was then prepared (see FIG. 1). Next as shown in FIG. 14, the gas sensor 1 and a water jet nozzle 75 were attached inside a pipe 74. The installation positions of the gas sensor 1 and the water jet nozzle 75 were adjusted such that the outer-side flow holes 611 in the outer cover 6 of the gas sensor 1 and the injection port 751 of the water jet nozzle 75 were at the same height (see FIGS. 1, 2 and 14). The pipe 74 was coupled to a heat pipe 76 having a built-in heater 761. Air A at a temperature of 280° C. was then passed at a flow speed of 12.6 m/s from the heat pipe 76 to the interior of the pipe 74. Furthermore, 0.2 ml of water W was sprayed 5 times under a condition of 200° C. temperature of the sensor element 2 in the interior of the gas sensor 1. Thereafter the sides and the tip face of the sensor element 2 were examined. If water has impinged on the sensor element 2, then as shown in FIGS. 15B and 16B, the carbon will become detached from the regions on which the water has impinged, and the color of these regions will change from black to gray or white. The area of these regions (from which the carbon has become detached) is measured by image analysis. This area is the water-affected area. In the present experimental example, the water-affected areas were measured for each of a plurality of gas sensors 1 having respectively different values of the distance L1 between the tip 21 of the sensor element 2 and the base position 513 of the inner-side flow holes 511 in the Z-axis direction. Next, setting the water-affected area of the gas sensor for which the distance L1 is 0 mm (L1=0 mm) as 1, the values of water-affected area of the other gas sensors were expressed as relative values with respect to 1. The results are as shown in FIG. 17, described hereinafter.

Figure 17:
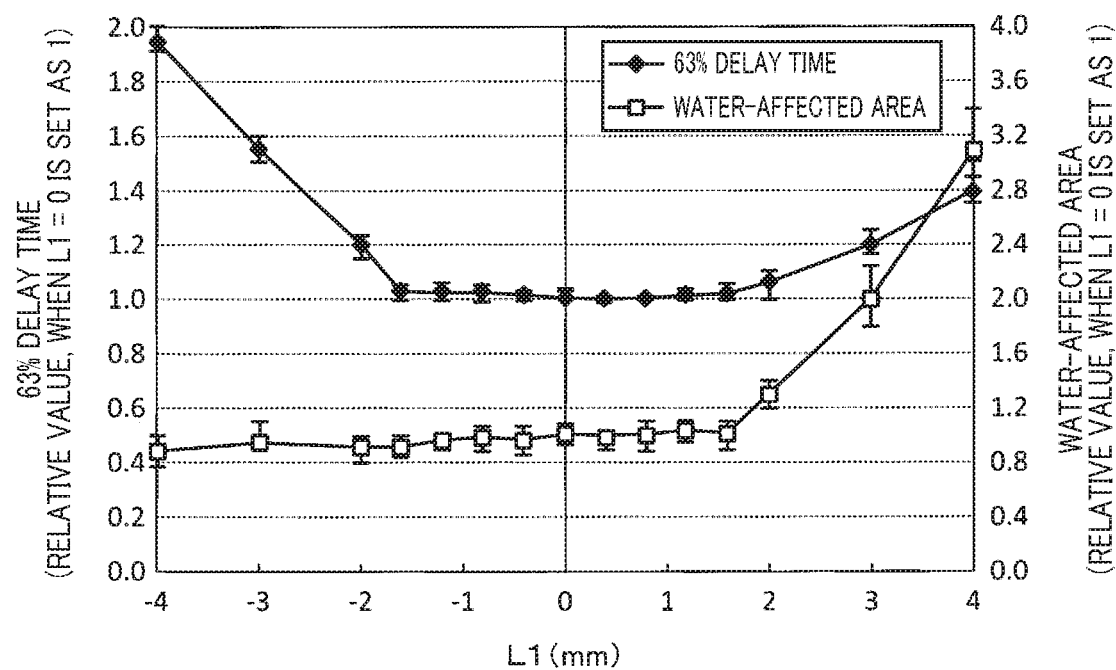
FIG. 17 is a diagram showing the relationship between a distance L1 and a 63% response time, and the relationship between the distance L1 and a water-affected area, in the first experimental example.

The 63% response times and water-affected areas shown in FIG. 17 are values calculated from measured values obtained using five gas sensors. Specifically, FIG. 17 shows averages of calculated values as plotted points, with maximum and minimum values indicated by error bars. This is also the case for FIGS. 18 and 19, described hereinafter. The distance L1 shown in FIG. 17 is shown as positive (+) values when the tip 21 of the sensor element 2 is positioned closer to the axial-direction tip end Z1 than is the base position 513 of the inner-side flow holes 511, and is shown as negative (−) values when the tip 21 of the sensor element 2 is positioned at the axial-direction base end Z2 (see FIG. 2).

As shown in FIG. 17, when the distance L1 between the tip 21 of the sensor element 2 and the base position 513 of the inner-side flow holes 511 in the Z-axis direction is within 1.6 mm (−1.6 mm≤L1≤+1.6 mm), then the 63% response time becomes short, and the responsiveness of the sensor output is increased. Furthermore in that case, the water-affected area becomes small also. For that reason, the amount of moisture impinging on the sensor element 2 becomes small, and water-induced cracking of the sensor element 2 can be prevented. On the other hand if the distance L1 is changed from 1.6 mm, and the tip 21 of the sensor element 2 is positioned closer to the axial-direction base end Z2 than is the base position 513 of the inner-side flow holes 511 (the case in which −1.6 mm>L1) then the 63% response time becomes substantially increased, and the responsiveness of the sensor output is lowered. Furthermore if the distance L1 is changed from 1.6 mm, and the tip 21 of the sensor element 2 is positioned closer to the axial-direction tip end Z1 than is the base position 513 of the inner-side flow holes 511 (the case in which +1.6 mm<L1) then the 63% response time becomes increased and the responsiveness of the sensor output is lowered. Moreover in that case, the water-affected area becomes substantially increased, and water-induced cracking of the sensor element 2 is facilitated. Hence the distance L1 is preferably within ±1.6 mm (−1.6 mm≤L1≤+1.6 mm). From the aspects of further preventing water-induced cracking of the sensor element 2 and further increasing the responsiveness of the sensor output, the distance L1 is preferably within ±1.3 mm (−1.3 mm≤L1≤+1.3 mm), and even more preferably, should be within ±1 mm (−1 mm≤L1≤+1 mm).

In that way, the following can be understood from the present experimental example. Specifically, the distance L1 between the tip 21 of the sensor element 2 and the base position 513 of the inner-side flow holes 511 with respect to the Z-axis direction should be less than or equal to 1.6 mm. In that way, water-induced cracking of the sensor element 2 is prevented, and lowering of the responsiveness of the sensor output can be suppressed (see FIG. 1 and FIG. 2).

Second Experimental Example

In a second experimental example, the responsiveness of the sensor output and the amount of moisture impinging on the sensor element 2 were evaluated (see FIG. 11) for a plurality of gas sensors, each being as shown for the second embodiment, having respectively different values of the ratio ($\Phi1/\Phi2$) of the outer diameter $\Phi1$ of the inner cover 5 and the inner diameter $\Phi2$ of the outer cover 6. As for the first experimental example, the type of sensor element 2 used in the present experimental example was the same as that of the second embodiment, unless otherwise indicated. Furthermore the method of evaluating the responsiveness of the sensor output and the amount of moisture that impinges on the sensor element 2 was the same as for the first experimental example. The 63% response time of the gas sensor for which the ratio of the outer diameter $\Phi1$ of the inner cover 5 and the inner diameter $\Phi2$ of the outer cover 6 was 0.9 ($\Phi1/\Phi2=0.9$) was set as 1, and the values of 63% response times of the other gas sensors were expressed as relative values with respect to 1. This was also done for the water-affected areas. The results are shown in FIG. 18.

As shown in FIG. 18, when the outer diameter $\Phi1$ of the inner cover 5 and the inner diameter $\Phi2$ of the outer cover 6 satisfy the expression [1] ($0.15\leq\Phi1/\Phi2\leq0.5$) the 63% response time becomes short and the responsiveness of the sensor output is increased. Furthermore it can be seen that, when the ratio of the inner cover 5 and the inner diameter $\Phi2$ of the outer cover 6 is less than or equal to 0.5 ($\Phi1/\Phi2\leq0.5$) then the amount of moisture impinging on the sensor element 2 becomes smaller, and water-induced cracking of the sensor element 2 can be further prevented. Hence from the aspects of further preventing water-induced cracking of the sensor element 2 and further increasing the responsiveness of the sensor output, it is preferable that the outer diameter $\Phi1$ of the inner cover 5 and the inner diameter $\Phi2$ of the outer cover 6 satisfy the expression [1] ($0.15\leq\Phi1/\Phi2\leq0.5$). It is even more preferable that the outer diameter $\Phi1$ of the inner cover 5 and the inner diameter $\Phi2$ of the outer cover 6 satisfy the following expression [1-1]:

$$0.2\leq\Phi1/\Phi2\leq0.4 \qquad [1\text{-}1]$$

Third Experimental Example

In a third experimental example, the responsiveness of the sensor output and the amount of moisture impinging on the sensor element 2 were evaluated (see FIG. 12) for a plurality of gas sensors, each being as shown for the third embodiment, having respectively different values of the ratio (L3/L2) of the total length L3 of the part of the inner cover 5 extending from the tapered-diameter step part 53 to the axial-direction tip end Z1 and the total length L2 of the inner cover 5. As for the first experimental example, the type of sensor element 2 used in the present experimental example was the same as that of the third embodiment, unless otherwise indicated. Furthermore the method of evaluating the responsiveness of the sensor output and the amount of moisture that impinges on the sensor element 2 was the same as for the first experimental example. In the present experimental example, the 63% response time of the gas sensor for which the ratio of the length L3 to the length L2 was 0 9 (L3/L2=0.9) was set as 1, and the values of 63% response times of the other gas sensors were expressed as relative values with respect to 1. This was also done for the water-affected areas. The results are shown in FIG. 19.

As shown in FIG. 19, when the length L2 and the length L3 satisfy the expression [2] ($0.5\leq L3/L2\leq0.7$), the amount of moisture impinging on the sensor element 2 becomes smaller, and water-induced cracking of the sensor element 2 can be further prevented. Furthermore it can be seen that when the ratio of the length L3 to the length L2 is less than or equal to 0.7 (L3/L2≤0.7) then the 63% response time becomes shorter and the responsiveness of the sensor output is increased. Hence from the aspects of being able to further reduce water-induced cracking of the sensor element 2 and further increase the responsiveness of the sensor output, it is desirable that the length L2 and the length L3 satisfy the expression [2] ($0.5\leq L3/L2\leq0.7$). It is even more preferable that the length L2 and the length L3 satisfy the following expression [2-1]:

$$0.5\leq L3/L2\leq0.6 \qquad [2\text{-}1]$$

Fourth Embodiment

A fourth embodiment of a gas sensor will be described in which the position relationship between the tip of a pump electrode in a sensor element 2 and the base position 513 of the inner-side flow holes 511 is adjusted. As shown in FIGS. 20 to 23, the gas sensor 1 has a sensor element 2 that is provided with a gas introduction part 25, a pump electrode 211, etc.

Figure 20:
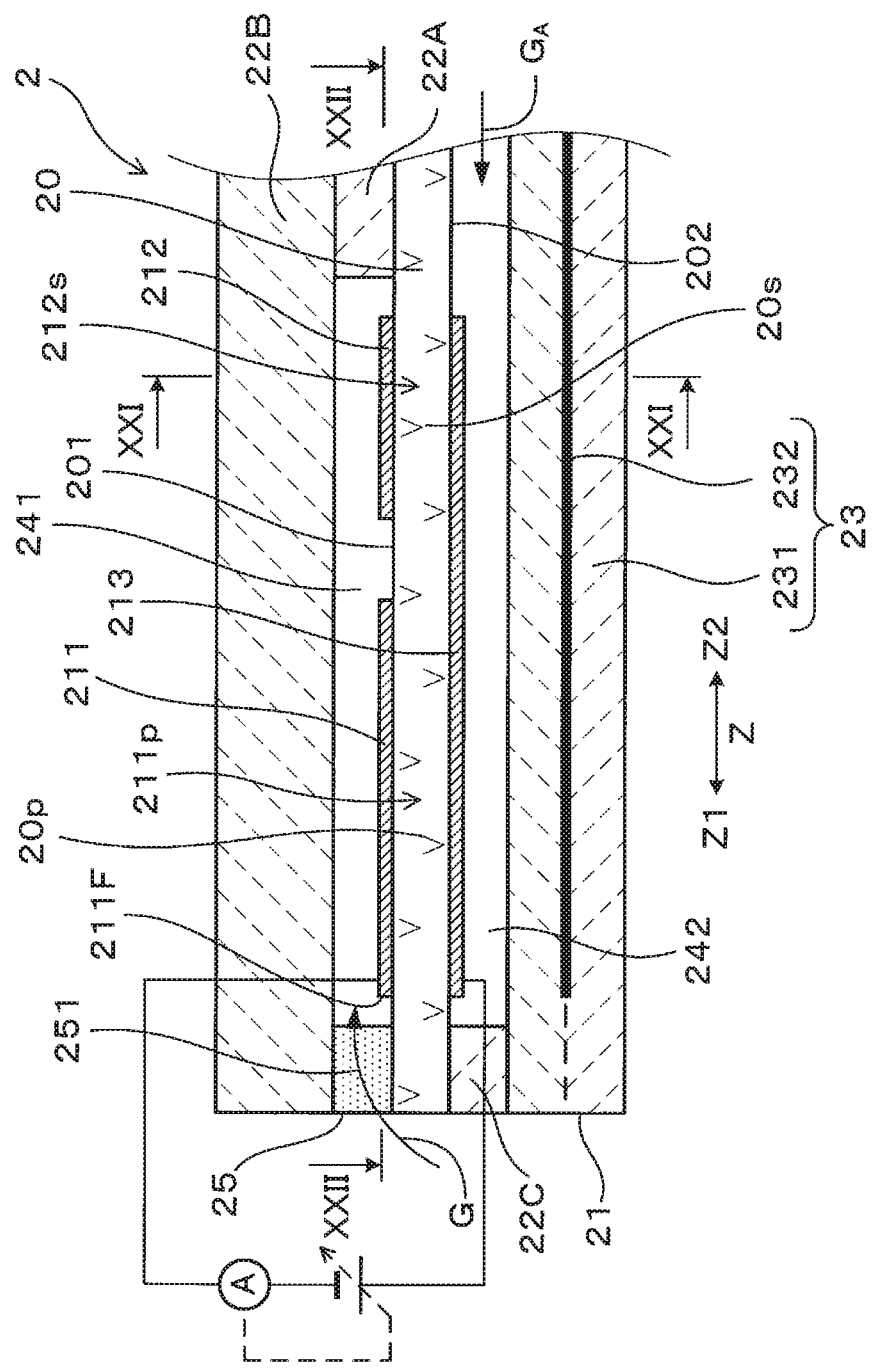
FIG. 20 is an axial-direction cross-sectional view of a sensor element of the fourth embodiment.
Figure 21:
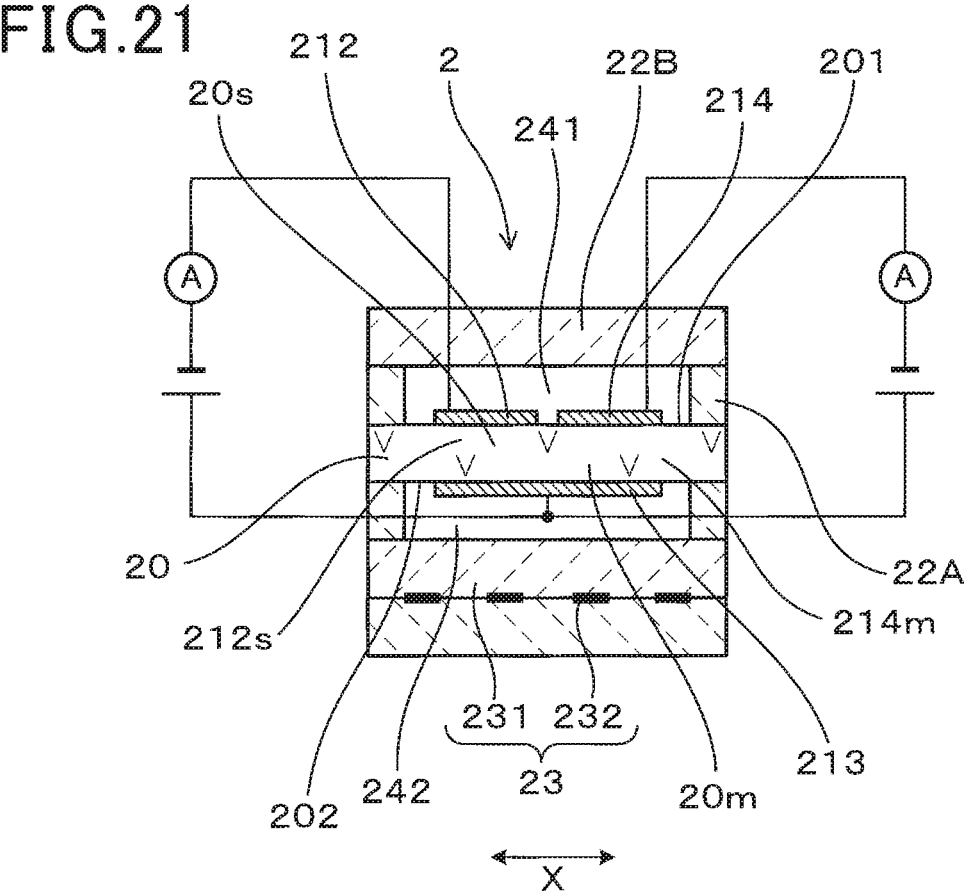
FIG. 21 is a cross-sectional view taken in a plane indicated by arrows XXI-XXI in FIG. 20.

Specifically, as shown in FIGS. 20 to 21, the sensor element 2 is provided with a solid electrolyte body 20, a measurement gas chamber 241, and a reference gas chamber 242. Furthermore the sensor element 2 is provided with a pump electrode 211, a sensor electrode 212, a reference electrode 213, a monitor electrode 214 and a heater 23.

The measurement gas chamber 241 is a space into which the gas G that is being measured, such as exhaust gas or the like, is introduced from the gas introduction part 25 of the sensor element 2, and can be formed for example as a single space. On the other hand the reference gas chamber 242 is a space into which a reference gas $G_A$ such as air or the like is introduced from a reference gas introduction part (not shown in the drawings) that is positioned at the axial-direction base end Z2 of the sensor element 2. The reference gas chamber 242 can be formed for example as a single space.

The solid electrolyte body 20 is formed of ceramic which has oxygen ion conductivity, in the shape of a flat plate. Yttrium-stabilized zirconium may be used as this type of ceramic, or alternatively another type of ceramic having oxygen ion conductivity may be used.

The solid electrolyte body 20 is positioned between the measurement gas chamber 241 and the reference gas chamber 242. A first main face 201 of the plate-shaped solid electrolyte body 20 is formed adjacent to the measurement gas chamber 241, with the first main face 201 facing the measurement gas chamber 241. On the other hand, a second main face 202 of the solid electrolyte body 20 is formed adjacent to the reference gas chamber 242 into which the reference gas $G_A$ is introduced, with the second main face 202 facing the reference gas chamber 242.

Figure 22:
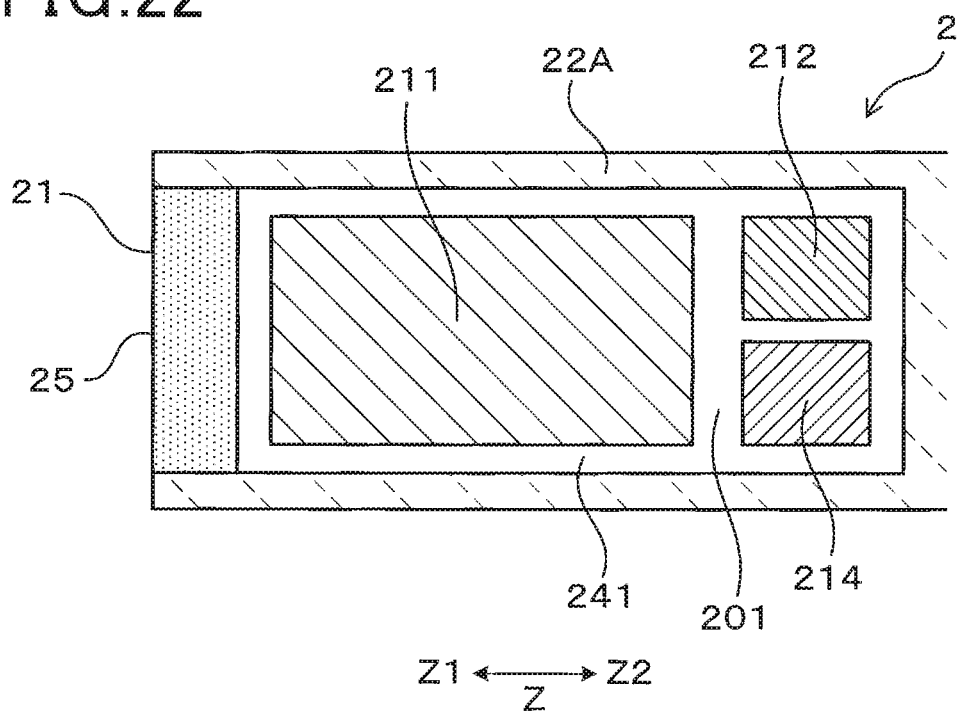
FIG. 22 is a cross-sectional view taken in a plane indicated by arrows XXII-XXII in FIG. 20.

As shown in FIG. 22, the pump electrode 211, the sensor electrode 212 and the monitor electrode 214 are formed on the first main face 201 of the solid electrolyte body 20, with the respective electrodes pump electrode 211, sensor electrode 212 and monitor electrode 214 facing the measurement gas chamber 241. On the other hand as FIGS. 20 and 21, the reference electrode 213 is formed on the second main face 202, with the reference electrode 213 facing the reference gas chamber 242. As shown in FIGS. 20 to 22, the pump electrode 211 is formed at the axial-direction tip end Z1 of the first main face 201. On the other hand, the sensor electrode 212 and the monitor electrode 214 are positioned on the first main face 201 closer to the axial-direction base end Z2 than is the pump electrode 211 and are formed mutually parallel.

In the sensor element 2 as shown in FIG. 20, a pump cell 211p which adjusts the oxygen concentration within the measurement gas chamber 241 is formed by the pump electrode 211, a portion 20p of the solid electrolyte body 20, and the reference electrode 213. When a voltage is applied between the pump electrode 211 and the reference electrode 213, the pump electrode 211 removes oxygen that is in the measurement gas chamber 241. The oxygen concentration within the gas G that is being measured that is in the measurement gas chamber 241 is thereby adjusted to a prescribed density.

Furthermore with the sensor element 2 as shown in FIG. 21, a monitor cell 214m which detects the residual oxygen concentration within the gas G that is being measured is formed by the monitor electrode 214, the portion 20m of the solid electrolyte body 20, and the reference electrode 213. The monitor cell 214m detects the current that flows between the monitor electrode 214 and the reference electrode 213, through the portion 20m of the solid electrolyte body 20. The residual oxygen concentration within the gas G that is being measured in the measurement gas chamber 241 is thereby detected.

On the other hand with the sensor element 2 as shown in FIGS. 20 and 21, a sensor cell 212s is formed which output a signal in accordance with the density of a specific gas component in the gas G that is being measured, with the sensor cell 212s being formed by the sensor electrode 212, the portion 20s of the solid electrolyte body 20, and the reference electrode 213. The sensor cell 212s measures the current that flows between the sensor electrode 212 and the reference electrode 213 via the portion 20s of the solid electrolyte body 20, to thereby measure the concentration of the specific gas component in the gas G that is being measured within the measurement gas chamber 241.

The gas introduction part 25, which introduces the gas G that is being measured into the measurement gas chamber 241, is formed at the tip 21 of the sensor element 2. The pump electrode 211 is formed closer to the axial-direction tip end Z1 than is the monitor electrode 214 and the sensor electrode 212. That is to say, when the gas G that is being measured is introduced into the interior of the measurement gas chamber 241, then after the oxygen concentration of the gas has been adjusted at the axial-direction tip end Z1, the gas flows to the axial-direction base end Z2. Hence with the monitor cell 214m, the residual oxygen concentration in the gas G being measured is detected after the oxygen concentration in the gas G has been adjusted by the pump cell 211p. Similarly, with the sensor cell 212s, the residual concentration of the specific gas component in the gas G being measured is detected after the oxygen concentration in the gas has been adjusted by the pump cell 211p. In the present embodiment, the effect of the residual oxygen concentration on the detection of the concentration of the specific gas component in the gas G being measured is corrected, by subtracting the output (detected value) of the monitor cell 214m from the output (detected value) of the sensor cell 212s. It should be noted that in the interior of the measurement gas chamber 241, the axial-direction tip end Z1 is at the upstream side of the flow of the gas G that is being measured, while the axial-direction base end Z2 is at the downstream side.

Figure 24:
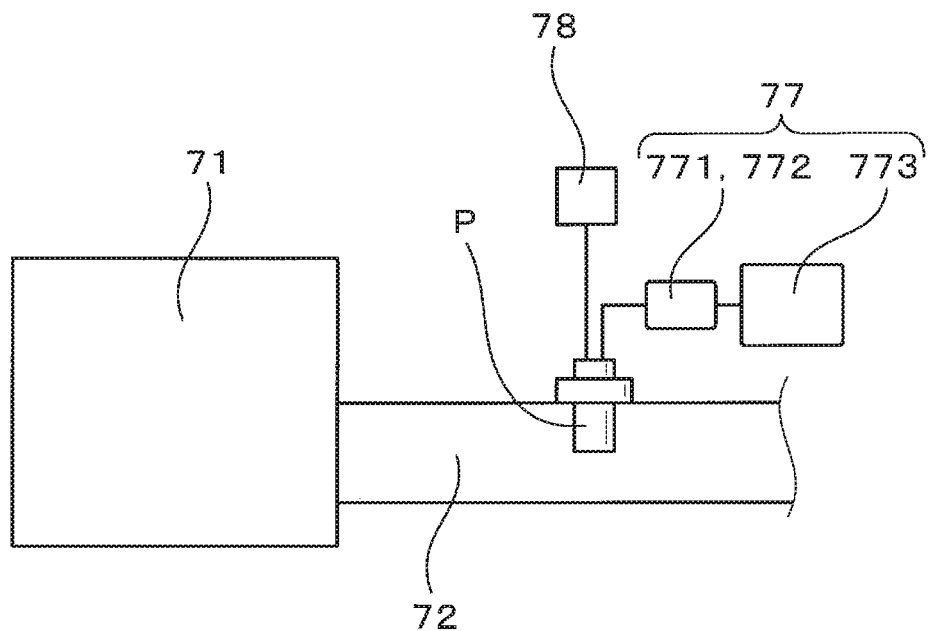
FIG. 24 is a conceptual diagram of a method of measuring temperature variation of sensor electrodes, in the fourth experimental example.

Insulators 22A, 22B and 22C, formed of ceramic, are stacked on the plate-shaped solid electrolyte body 20. The sensor element 2 furthermore includes a plate-shaped heater 23 for heating the solid electrolyte body 20. The heater 23 is disposed facing the solid electrolyte body 20, formed stacked in the sensor element 2. In the gas sensor 1 of the present embodiment, the electric power that is supplied to the heater 23 is controlled based on the impedance of the pump cell 211p, for example by an external controller 77 that is shown in FIG. 24. The external controller 77 can configure for example of a detection circuit 771 that is connected to the gas sensor 1, and a sensor control circuit 772, or can also include a computer 773 or the like that is connected to these. In the gas sensor 1, the sensor element 2 is controlled to a prescribed temperature by the external controller 77 based on the relationship between the impedance of the 211p and the electric power that is supplied to the heater 23. Specifically, with the sensor element 2, the temperature of the pump electrode 211 may be controlled to 800° C. and the temperature of the sensor electrode 212 may be controlled to 600° C., for example.

The measurement gas chamber 241 is formed enclosed by the plate-shaped first insulator 22A and the plate-shaped second insulator 22B that are stacked on the first main face 201 of the solid electrolyte body 20. The reference gas chamber 242 is formed enclosed by the plate-shaped third insulator 22C and the plate-shaped heater 23 that are stacked on the second main face 202 of the solid electrolyte body 20. The heater 23 has a substrate 321 and a heater body 232 that is imbedded in the interior of the substrate 321. The heater body 232 is heated by passing a current. The first insulator 22A, second insulator 22B and third insulator 22C are respective spacers.

The gas introduction part 25 for introducing the gas G that is being measured into the interior of the measurement gas chamber 241 is disposed at the axial-direction tip end Z1 of the measurement gas chamber 241. The gas introduction part 25 has a diffusion resistor 251 for introducing the gas G that is being measured into the measurement gas chamber 241 under a prescribed diffusion resistance. The diffusion resistor 251 is formed of a porous ceramic material.

As shown in FIGS. 20 to 23, the axial-direction tip end Z1 of the sensor element 2 in the gas sensor 1 is inserted into the element cover 4. That is to say, the axial-direction tip end Z1 of the sensor element 2 is disposed in the interior of the element cover 4. The element cover 4 has the same configuration as that of the first embodiment, having an inner cover 5 and an outer cover 6. The base position 513 of the inner-side flow holes 511 in the inner cover 5 is disposed closer to the axial-direction tip end Z1 than is the tip position 211F of the pump electrode 211. Alternately stated, the tip position 211F of the pump electrode 211 is disposed closer to the axial-direction base end Z2 than is the base position 513 of the inner-side flow holes 511.

The position relationship between the base position 513 of the inner-side flow holes 511 and the tip position 211F of the pump electrode 211 was adjusted as follows. For example, an adjustment method may be used whereby the position at which the pump electrode 211 is formed along the axial direction Z is adjusted. Another possible adjustment method is to adjust the insertion extent of the sensor element 2 into the interior of the inner cover 5, to thereby adjust the position of the tip 21 of the sensor element 2 in the inner cover 5. Furthermore other possible adjustment methods would be to adjust the positions at which the inner-side flow holes 511 are formed in the inner cover 5, or to adjust the shape, or size, etc., of the inner-side flow holes 511.

Figure 23:
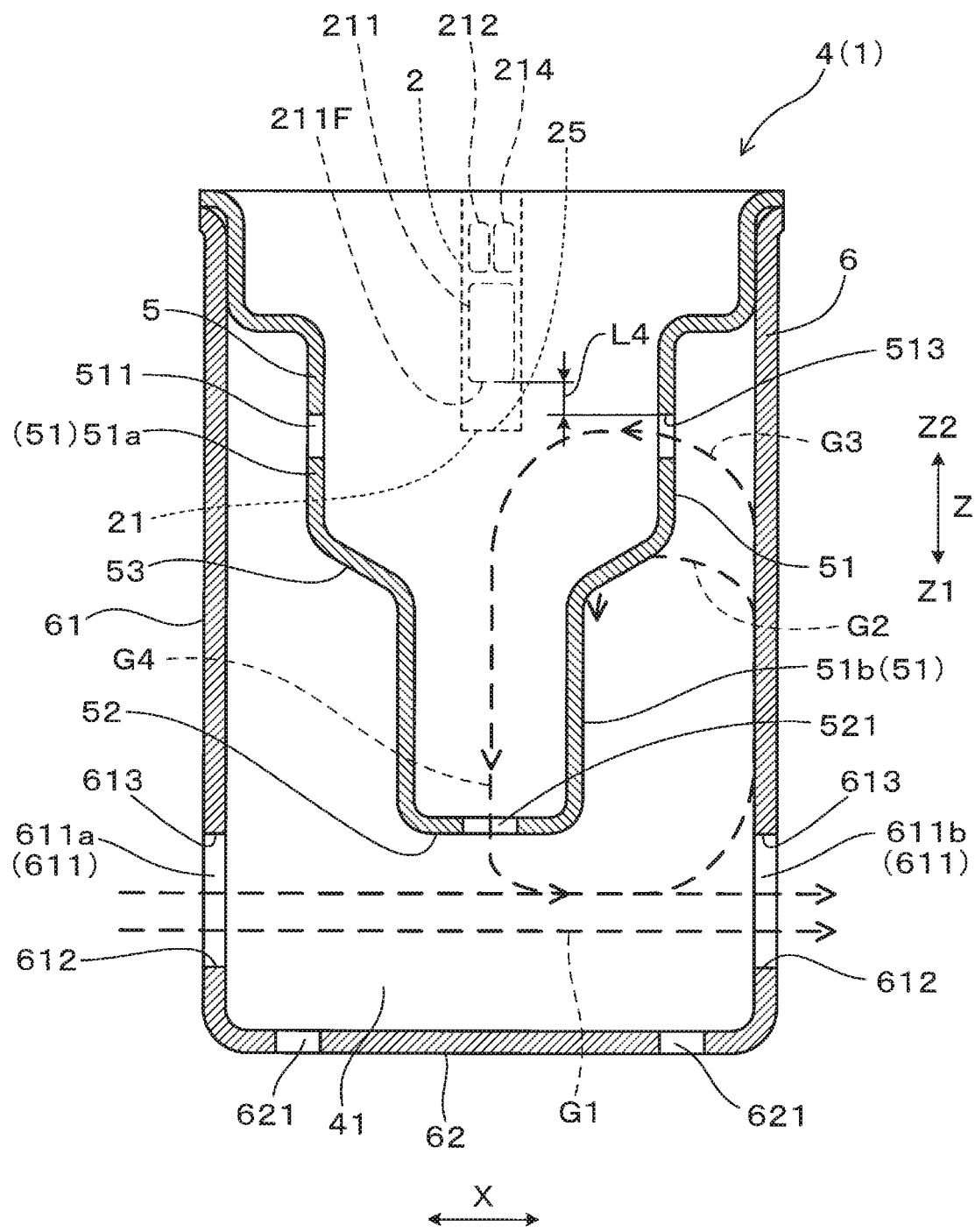
FIG. 23 is a cross-sectional view of a gas sensor element cover of the fourth embodiment.

In the gas sensor 1 of the present embodiment, as shown by the broken-line arrow G1 in FIG. 23, the exhaust gas flows from an outer-side flow hole 611a of the outer cover 6 into the space 41 that is formed between the outer cover 6 and the inner cover 5. At that time, as shown by the broken-line arrows G2, G3, a part of the exhaust gas that flows into the space 41 between the inner cover 5 and outer cover 6 collides with the inner wall (inner face) of the outer cover 6, and is drawn upward to the axial-direction base end Z2. As shown by the broken-line arrow G3, a part of the exhaust gas that is drawn upward flows from the inner-side flow holes 511 that are formed in the side 51 of the inner cover 5 (the inner-side flow holes 511 that are positioned downstream, with respect to the flow direction of the exhaust gas) into the interior of the inner cover 5. Due to this, a part of the exhaust gas reaches the inner circumference of the gas introduction part 25 of the sensor element 2.

As described above, the base position 513 of the inner-side flow holes 511 of the inner cover 5 is disposed closer to the axial-direction tip end Z1 than is the tip position 211F of the pump electrode 211 of the sensor element 2. The tip position 211F of the pump electrode 211 is positioned at the extreme end of the pump electrode 211, with respect to the axial direction Z. On the other hand, the base position 513 of the inner-side flow holes 511 is positioned at the extreme base side of the inner-side flow holes 511, with respect to the axial direction Z. For example if there are a plurality of inner-side flow holes 511, then the extreme base side of each of the inner-side flow holes 511 is positioned at the base position 513.

Comparison of the position relationships of the tip position 211F and the base position 513 is performed in the following way. For example, these are fixed such that they will not change in position along the axial direction Z, with respect to the sensor element 2 and the inner cover 5. If necessary, the inner cover 5, the outer cover 6 and the sensor element 2 are cut and polished at a prescribed position. As a result of this cutting and polishing, for example, the axial-direction tip end Z1 of the pump electrode 211 will be exposed from the sensor element 2. In addition, the tip position 211F of the pump electrode 211 can be compared with the base position 513 of the inner-side flow holes 511. The actual comparison can be performed by obtaining the shortest distance L4 between a face of the tip position 211F at right angles to the axial direction Z (a face that is parallel to the radial direction X) and a face at the base position 513 that is at right angles to the axial direction Z, and executing the comparison based on the results. Specifically, if the shortest distance L4 is greater than 0 mm (the case in which L4>0 mm) then it can be judged that the base position 513 of the inner-side flow holes 511 of the inner cover 5 is closer to the axial-direction tip end Z1 than is the tip position 211F of the pump electrode 211. On the other hand if the shortest distance L4 is less than or equal to 0 (case in which L4≤0 mm) then it is judged that the base position 513 of the inner-side flow holes 511 is at the same position as is the tip position 211F of the pump electrode 211, or is at the axial-direction base end Z2.

If the shortest distance L4 is greater than 0, so that the base position 513 of the inner-side flow holes 511 of the inner cover 5 is closer to the axial-direction tip end Z1 than is the tip position 211F of the pump electrode 211, then as shown by the broken-line arrow G3, even if exhaust gas that is at a higher temperature or a lower temperature than the sensor element 2 flows into the interior of the inner cover 5, it will be difficult for the exhaust gas to impinge on the position at which the pump electrode 211 of the sensor element 2 is formed. As a result, the impedance of the pump cell 211p will not tend to be affected by temperature variations of the exhaust gas. Due to this, with the gas sensor 1 of the present embodiment, in which the sensor cell 212s is held to a predetermined temperature with the heater 23 based on the impedance of the pump cell 211p, the extent of temperature variation of the sensor cell 212s will be small, and scattering of the temperature values will be small. Hence, temperature control of the sensor element 2 is facilitated, and the accuracy of detecting a specific gas component concentration is increased. Moreover with the gas sensor 1 of the present embodiment, as for the first embodiment, the distance L1 between the tip 21 of the sensor element 2 and the base position 513 of the inner-side flow holes 511 in the Z-axis direction is adjusted to the above prescribed position relationship. As a result, as shown by the broken-line arrows G3 and G4 in FIG. 23, the exhaust gas that flows in the interior of the inner cover 5 passes through a space that is closer to the axial-direction tip end Z1 than to the tip 21 of the sensor element 2, and is then discharged from the inner bottom flow hole 521. That is to say, the area of contact between the sensor element 2 and the exhaust gas can be made small. From that aspect too, the above-described temperature variations can be made small.

Figure 27:
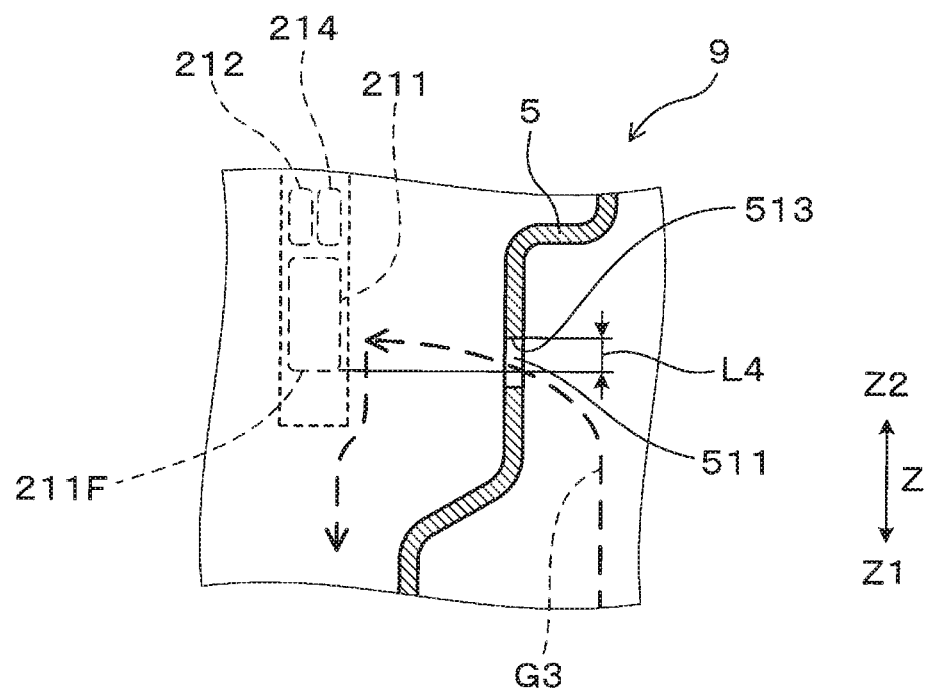
FIG. 27 is a partial expanded cross-sectional view of a gas sensor in which the base position of side-face flow holes in the inner cover is closer to the base end than is the tip position of a pump electrode.

In contrast to this, in the case in which the shortest distance L4 has a negative value, and when the base position 513 of the inner-side flow holes 511 is closer to the axial-direction base end Z2 than is the tip position 211F of the pump electrode 211, then as shown by the broken-line arrow G3 in FIG. 27, the exhaust gas that flows into the interior of the inner cover 5 impinges on the position at which the pump electrode 211 of the sensor element 2 is formed. As a result, the impedance of the pump cell 211p can readily be affected by changes in temperature of the exhaust gas. That is to say, if the exhaust gas is at a lower temperature than the sensor element 2, then when the exhaust gas that flows into the interior of the inner cover 5 and impinges on the position at which the pump electrode 211 of the sensor element 2 is formed, the pump electrode 211 will become cooled. If the pump electrode 211 becomes cooled in that way, and the electric power that is supplied to the heater 23 is controlled in accordance with the impedance of the pump electrode 211, then the sensor element 2 will become heated by the heater 23. For that reason, the temperature of the sensor electrode 212 will increase, so that variation in temperature of the sensor electrode 212 will be increased. There will thereby be a danger that the accuracy of detecting the specific gas component concentration in the gas G that is being measured will be adversely affected. On the other hand if, for example, exhaust gas at a temperature that is higher than the temperature of the sensor element 2 flows into the interior of the inner cover 5 and impinges on the position where the pump electrode 211 of the sensor element 2 is formed, part of the sensor element 2 will be heated, and the temperature of the pump electrode 211 will increase. Hence, if the electric power supplied to the heater 23 is controlled in accordance with the impedance of the pump electrode 211 in the manner described above, then the detection of the specific gas component concentration will be performed under an unchanging condition whereby insufficient heating is performed by the heater 23. In that case too, there will be a danger that the accuracy of detecting the specific gas component concentration in the gas G being measured will be adversely affected.

From the aspect of increasing the accuracy of detecting the specific gas component concentration in the gas G that is being measured, the shortest distance L4 is preferably made greater than or equal to 0.5 mm. That is to say, the base position 513 of the inner-side flow holes 511 is preferably 0.5 mm closer to the axial-direction tip end Z1 than is the tip position 211F of the pump electrode 211. From a similar aspect, it is even more preferable that the shortest distance L4 is made greater than or equal to 1 mm. That is to say, it is even more preferable that base position 513 of the inner-side flow holes 511 is more than 1 mm closer to the axial-direction tip end Z1 than is the tip position 211F of the pump electrode 211.

In other respects, the gas sensor 1 of the present embodiment has the same configuration as that of the first embodiment, and similar operational effects are provided as for the first embodiment. Furthermore the present embodiment may be configured as for the second embodiment or the third embodiment, or a combination of the second and third embodiments. In such a case, similar operational effects to those of the above embodiments will be provided.

Fourth Experimental Example

In a fourth present experimental example, a comparison is made (see FIGS. 20 to 23) between temperature variations of the sensor electrode 212 of the sensor element 2 for two gas sensor, with the gas sensors having respectively different relationships between the tip position 211F of the pump electrode 211 and the base position 513 of the inner-side flow holes 511.

Specifically, a sensor A and a sensor B are prepared, as two different types of gas sensor. The sensor A has the same configuration as for the fourth embodiment, whereby the base position 513 of the inner-side flow holes 511 of the inner cover 5 is closer to the axial-direction tip end Z1 than is the tip position 211F of the pump electrode 211 of the sensor element 2. More specifically, with the sensor A, the base position 513 of the inner-side flow holes 511 is located 1 mm closer to the axial-direction tip end Z1 than is the tip position 211F of the pump electrode 211, and the shortest distance L4 is made +1 mm (L4=+1 mm) (see FIG. 23).

On the other hand the sensor B is a gas sensor 9, as shown in FIG. 27, in which the base position 513 of the inner-side flow holes 511 is disposed closer to the axial-direction base end Z2 than is the tip position 211F of the pump electrode 211. More specifically, In the case of the sensor B, the base position 513 of the inner-side flow holes 511 is set 1 mm closer to the axial-direction base end Z2 than is the tip position 211F of the pump electrode 211, with the shortest distance L4 being −1 mm (L4=−1 mm). In other respects, the configuration of the sensor A is the same as that of the sensor B.

In the present experimental example, the temperature variation of the sensor electrode 212 was compared between the sensor A and sensor B. Specifically, firstly as shown in FIG. 24, a gas sensor P that is the object of the experiment (referred to in the following as the experiment-object sensor P) was attached to an exhaust pipe 72 which was coupled to a diesel engine 71. Next as shown in FIGS. 20 to 24, the heater 23 was heated by the sensor control circuit 772 to set the sensor element 2 at a prescribed temperature. Next, the experiment-object sensor P was driven by applying a voltage across the pump cell 211p, across the sensor cell 212s, and across the monitor cell 214m. Furthermore the diesel engine 71 was operated to produce a flow of exhaust gas in the exhaust pipe 72 at a gas flow speed of 40 m/s and a temperature of 200° C. (gas flow condition). The temperature of the sensor element 2 was measured as the temperature of the sensor electrode 212, using a thermocouple that was inserted into the center of the sensor electrode 212 from a reference gas introduction part (not shown in the drawings) that is positioned at the axial-direction base end Z2 of the sensor element 2, and with the temperature of the sensor electrode 212 being measured by a temperature measuring instrument 78.

In the actual measurement of temperature variation, firstly the experiment-object sensor P was driven and the diesel engine 71 kept in a non-operating condition, until the temperature of the sensor electrode 212 had stabilized. Next, the diesel engine 71 was operated to produce the above-described gas flow condition, with this being maintained until the temperature of the sensor electrode 212 reached a constant value, and the temperature variation was calculated (see FIG. 25).

Figure 25:
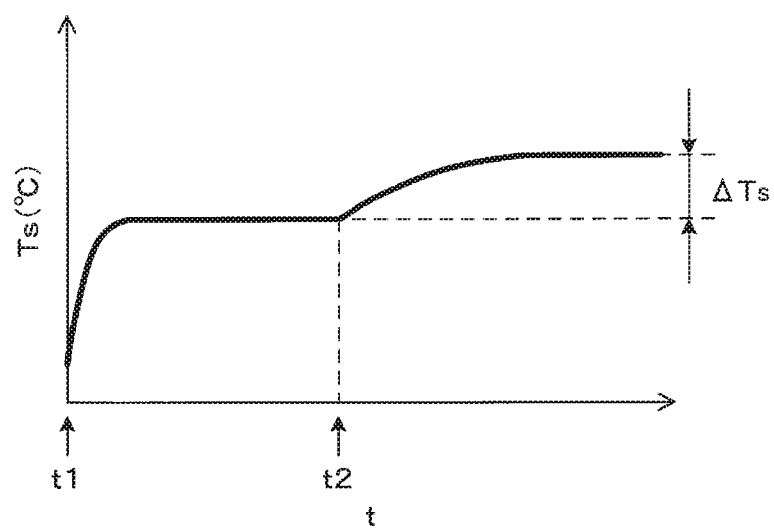
FIG. 25 is a diagram showing the relationship between elapsed time t and sensor electrode temperature Ts, in the fourth experimental example.

In the graph of FIG. 25, values of elapsed time t are plotted along the horizontal axis, while values of sensor electrode temperature Ts are plotted along the vertical axis. Time t1 on the horizontal axis indicates the start of driving the experiment-object sensor P, while t2 indicates the time of starting operation of the engine and ΔTs expresses the temperature variation of the sensor electrode 212. In the present experimental example, the temperature of the pump electrode 211 was controlled to a value of 800° C. and the temperature of the sensor electrode 212 was controlled to 600° C., however the actual values of the temperature of the pump electrode 211 and temperature of the sensor electrode 212 varied to some extent from these control temperatures. The results are as shown in FIG. 26.

As described above, with the experiment-object sensor P, the sensor electrode 212 of the sensor element 2 is controlled to a prescribed temperature by the sensor control circuit 772 based on the relationship between the impedance of the pump cell 211p (pump electrode 211) and temperature. On the other hand if, as above, exhaust gas that is at a lower temperature than that of the sensor element 2 is supplied by operating the diesel engine 71, there is a danger that the temperature of the pump electrode 211 of the experiment-object sensor P will become lowered. Hence, in accordance with the extent of lowering of the temperature of the pump electrode 211, a variation will occur in the temperature to which the pump electrode 211 is heated by the heater 23, which is controlled by electric power supplied from the external control apparatus 77. As a result as shown in FIG. 25, the temperature of the sensor electrode 212 of the experiment-object sensor P will rise to a value that is higher than the prescribed temperature.

Figure 26:
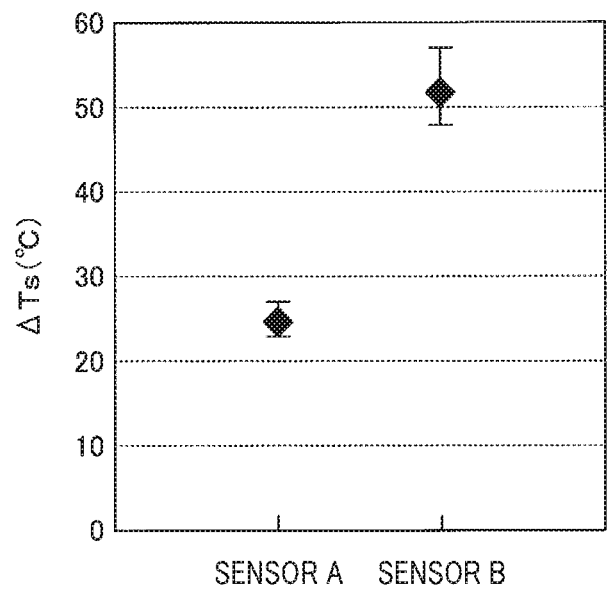
FIG. 26 is a diagram showing sensor electrode temperature variation $\Delta Ts$ of a sensor A and a sensor B.

In the case in which the experiment-object sensor P is the sensor A, as shown in FIG. 26, the temperature variation of the sensor electrode 212 of the sensor element 2 is approximately 25° C., so that the amount of variation is small. Furthermore there is almost no scattering of the temperature variation values. This is due to the fact that the base position 513 of the inner-side flow holes 511 is closer to the axial-direction tip end Z1 than is the tip position 211F of the pump electrode 211. As a result, the exhaust gas can be prevented from impinging on the position at which the pump electrode 211 of the sensor A is formed. As a result of this, the control of temperature by the heater 23 is almost unaffected by variations in temperature of the exhaust gas. It can be considered that the experimental results obtained for the sensor A, shown in FIG. 26, were obtained for the above reason.

On the other hand In the case of sensor B, since the base position 513 of the inner-side flow holes 511 is situated closer to the axial-direction base end Z2 than is the tip position 211F of the pump electrode 211, the exhaust gas can readily reach the position at which the pump electrode 211 is formed. Due to this, the sensor element 2 becomes cooled. Accordingly, with the sensor B, the electric power that is supplied to the heater 23 for controlling the sensor element 2 to a predetermined temperature will be increased, so that the temperature of the sensor electrode 212 will rise considerably. As a result, as shown in FIG. 26, the temperature variation of the sensor electrode 212 of the sensor element 2 of the sensor B is approximately 52° C., so that the temperature variation is large. Moreover, scattering of the temperature variation values is also large. Although not shown in the drawings, it was confirmed that in the case in which the base position 513 of the inner-side flow holes 511 is the same as the tip position 211F of the pump electrode 211 with respect to the axial direction Z (L4=0 mm), the temperature variation of the sensor electrode 212 of the sensor element 2 is approximately 50° C., so that approximately the same large amount of temperature variation occurs as for the sensor B.

In particular, in the case of a gas sensor for use as a NOx sensor, a plurality of electrodes including the pump electrode 211, the sensor electrode 212, etc., are formed in the sensor. Due to this, control of the pump electrode 211 by another electrode such as the sensor electrode 212, etc., is required as described above. In the case in which the temperature of the sensor electrode 212 is for example set to 600° C. as with the present experimental example, the temperature variation of the sensor electrode 212 of the sensor element 2 is preferably kept within ±30° C. If a sensor electrode 212 for which the temperature variation exceeds 30° C. attains a high temperature, water within the exhaust gas may become decomposed at the sensor electrode 212, generating hydrogen, and causing a danger of adversely affecting the accuracy of detecting the specific gas component concentration in the gas G that is being measured. Furthermore in such a case, there is a danger of deterioration of the sensor electrode 212, and such deterioration would also result in a danger of adversely affecting the detection accuracy. On the other hand, if a sensor for which the temperature variation exceeds 30° C. attains a low temperature, and the temperature becomes excessively low, it may not be possible to sufficiently detect the specific gas component concentration in the gas G that is being measured, so that there is a danger of lowering the detection accuracy.

Accordingly, the following points can be understood from the present experimental example. Specifically, as described for the fourth embodiment, the base position 513 of the inner-side flow holes 511 of the inner cover 5 should be disposed closer to the axial-direction tip end Z1 than is the tip position 211F of the pump electrode 211. If that is done, then with the gas sensor 1, even when temperature control of the sensor element 2 is performed based on the temperature of the pump electrode 211, the temperature variation of the sensor cell 212s will be small. As a result, temperature control of the sensor element 2 is facilitated, and increased accuracy will be achieved in detecting the specific gas component concentration in the gas G that is being measured.

The technology of the present disclosure is not limited to the above-described embodiments and experimental examples. Various changes may be made, without departing from the scope of the technology of the present disclosure. For example, it is not essential for the sensor element 2 to have a monitor electrode 214 and a monitor cell 214m. Even if these are not provided, the above-described effects will be obtained.

DESCRIPTION OF SYMBOLS

1 Gas sensor
2 Sensor element
3 Housing
4 Element cover
5 Inner cover
511 Inner-side flow holes
6 Outer cover
611 Outer-side flow holes

The invention claimed is:
1. A gas sensor comprising:
a sensor element which detects a specific gas component concentration in a gas that is being measured;
a housing having the sensor element disposed in the interior thereof and retained therein; and
an element cover disposed at an axial-direction tip end of the housing;
with a gas introduction part being provided at a tip of the sensor element, for introducing the gas that is being measured into the interior of the sensor element;
and with the element cover having an inner cover formed in a tubular shape having a bottom, disposed to cover the axial-direction tip end of the sensor element, and having an outer cover formed in a tubular shape having a bottom, disposed to form a space that is open to an outer side of the inner cover,
wherein:
a side of the inner cover is provided with inner-side flow holes for circulating the gas that is being measured, and an inner bottom flow hole is provided in the bottom of the inner cover, for circulating the gas that is being measured;
the inner cover is provided with a tapered-diameter step part that is tapered inwards toward the axial-direction tip end of the gas sensor and the inner-side flow holes are disposed closer to an axial-direction base end of the gas sensor than is the tapered-diameter step part;
outer-side flow holes into which the gas that is being measured is introduced are provided in a side of the outer cover, for circulating the gas that is being measured;

a tip position of the outer-side flow holes is disposed closer to the axial-direction tip end of the gas sensor than is the bottom of the inner cover;

the tip of the sensor element is disposed closer to the axial-direction tip end of the gas sensor than is a base position of the inner-side flow holes or is disposed closer to the axial-direction base end of the gas sensor than is the base position of the inner-side flow holes;

a distance (L1) between the tip of the sensor element and the base position of the inner-side flow holes, with respect to an axial direction, satisfies a relationship −1.6 mm≤L1≤+1.6 mm.

2. The gas sensor according to claim 1 wherein, in a part of the inner cover that is closer to the axial-direction tip end of the gas sensor than is the tapered-diameter step part, the outer diameter (Φ1) of the inner cover and the inner diameter (Φ2) of the outer cover satisfy a relationship 0.15≤Φ1/Φ2≤0.5.

3. The gas sensor according to claim 1, wherein:

a total length (L2) of the inner cover is a length along the axial direction of a region of the inner cover that corresponds to the space formed between the inner cover and the outer cover; and the total length (L2) of the inner cover and a total length (L3) of the tapered-diameter step part and a part of the inner cover that is closer to the axial-direction tip end of the gas sensor than is the tapered-diameter step part, with respect to the axial direction of the gas sensor, satisfy a relationship 0.5≤L3/L2≤0.7.

4. The gas sensor according to claim 1, wherein a base position of the outer-side flow holes is disposed at a same position as that of the bottom of the inner cover or is disposed closer to the axial-direction base end of the gas sensor than is the bottom of the inner cover, with respect to the axial direction of the gas sensor.

5. The gas sensor according to claim 1, wherein the sensor element comprises:

a measurement gas chamber into which the gas that is being measured is introduced from the gas introduction part;

a reference gas chamber into which a reference gas is introduced;

a solid electrolyte body with oxygen ion conductivity, disposed between the measurement gas chamber and the reference gas chamber, having a first main face that faces the measurement gas chamber and a second main face that faces the reference gas chamber;

a reference electrode that is formed on the second main face of the solid electrolyte body;

a pump electrode that is formed on the first main face of the solid electrolyte body and which, together with the reference electrode and a part of the solid electrolyte body, constitutes a pump cell that adjusts the oxygen concentration within the gas that is being measured;

a sensor electrode that is formed on the first main face of the solid electrolyte body and which, together with the reference electrode and a part of the solid electrolyte body, constitutes a sensor cell that outputs a signal in accordance with the specific gas concentration in the gas that is being measured, after adjustment of the oxygen concentration by the pump cell; and a heater for heating the solid electrolyte body, disposed opposite the solid electrolyte body, with the solid electrolyte body separated from the heater by the reference gas chamber, wherein:

the pump electrode is formed closer to the axial-direction tip end of the sensor element than is the sensor electrode; and the base position of the inner-side flow holes is disposed closer to the axial-direction tip end of the gas sensor than is a tip position of the pump electrode, with respect to the axial direction of the gas sensor.

6. The gas sensor according to claim 5, further comprising a monitor electrode that is formed on the first main face of the solid electrolyte body and which, together with the reference electrode and a part of the solid electrolyte body, constitutes a monitor cell that detects the oxygen concentration in the gas that is being measured, after the oxygen concentration in the gas that is being measured has been adjusted by the pump cell, wherein the measurement gas chamber is formed as a single space.

7. The gas sensor according to claim 5, wherein electric power that is supplied to the heater is controlled based on an impedance of the pump cell, by an external control apparatus.

8. A gas sensor comprising:

a sensor element which detects a specific gas component concentration in a gas that is being measured;

a housing having the sensor element disposed in the interior thereof and retained therein; and an element cover disposed at an axial-direction tip end of the housing, wherein the sensor element comprises:

a measurement gas chamber into which the gas that is being measured is introduced in the interior of the sensor element;

a solid electrolyte body with oxygen ion conductivity;

a reference electrode that is formed on the solid electrolyte body;

a pump electrode that constitutes a pump cell that adjusts an oxygen concentration within the gas that is being measured, using a part of the solid electrolyte body and the reference electrode;

a sensor electrode that constitutes a sensor cell that outputs a signal in accordance with the specific gas component concentration in the gas that is being measured, using a part of the solid electrolyte body and the reference electrode; and a heater for heating the solid electrolyte body, disposed opposite the solid electrolyte body, with the solid electrolyte body separated from the heater, wherein:

the element cover has an inner cover formed in a tubular shape having a bottom, disposed to cover the axial-direction tip end of the sensor element, and has an outer cover formed in a tubular shape having a bottom, disposed to form a space that is open to an outer side of the inner cover, wherein the element cover further comprises:

outer-side flow holes into which the gas that is being measured is introduced in the outer cover;

inner-side flow holes into which the gas that is being measured is introduced in the inner cover, the gas being the gas which is introduced in the outer cover;

an outer-side bottom flow hole that is provided at the axial-direction tip end of the gas sensor in the bottom of the outer cover; and an inner bottom flow hole that is provided at the axial-direction tip end of the gas sensor in the bottom of the inner cover, wherein:
a tip position of the outer-side flow holes is disposed closer to the axial-direction tip end of the gas sensor than is the bottom of the inner cover;
the pump electrode is formed closer to the axial-direction tip end of the sensor element than is the sensor electrode;
a base position of the inner-side flow holes is disposed closer to the axial-direction tip end of the gas sensor than is a tip position of the pump electrode, with respect to an axial direction of the gas sensor;
a distance between the base position of the inner-side flow holes and the tip position of the pump electrode, with respect to the axial direction, is greater than or equal to 0.5 mm;
the tip of the sensor element is disposed closer to the axial-direction tip end of the gas sensor than is the base position of the inner-side flow holes or is disposed closer to the axial-direction base end of the gas sensor than is the base position of the inner-side flow holes;
a distance (L1) between the tip of the sensor element and the base position of the inner-side flow holes, with respect to the axial direction, satisfies a relationship $-1.6 \text{ mm} \leq L1 \leq 1.6 \text{ mm}$.

9. A gas sensor comprising:
a sensor element which detects a specific gas component concentration in a gas that is being measured;
a housing having the sensor element disposed in the interior thereof and retained therein; and
an element cover disposed at an axial-direction tip end of the housing;
with a gas introduction part being provided at a tip of the sensor element, for introducing the gas that is being measured into the interior of the sensor element;
and with the element cover having an inner cover formed in a tubular shape having a bottom, disposed to cover the axial-direction tip end of the sensor element, and having an outer cover formed in a tubular shape having a bottom, disposed to form a space that is open to an outer side of the inner cover,
wherein:
a side of the inner cover is provided with inner-side flow holes for circulating the gas that is being measured, and an inner bottom flow hole is provided in the bottom of the inner cover, for circulating the gas that is being measured;
the inner cover is provided with a tapered-diameter step part that is tapered inwards toward the axial-direction tip end of the gas sensor and the inner-side flow holes are disposed closer to an axial-direction base end of the gas sensor than is the tapered-diameter step part;
outer-side flow holes are provided in a side of the outer cover, for circulating the gas that is being measured;
a tip position of the outer-side flow holes is disposed closer to the axial-direction tip end of the gas sensor than is the bottom of the inner cover;
the tip of the sensor element is disposed closer to the axial-direction tip end of the gas sensor than is a base position of the inner-side flow holes or is disposed closer to the axial-direction base end of the gas sensor than is the base position of the inner-side flow holes;
a distance (L1) between the tip of the sensor element and the base position of the inner-side flow holes, with respect to an axial direction, satisfies a relationship $-1.6 \text{ mm} \leq L1 \leq +1.6 \text{ mm}$;

a position of the inner-side flow holes is disposed closer to the axial-direction base end of the gas sensor than is a position of the outer-side flow holes; and
the gas that is being measured is introduced to the interior of the gas sensor through the outer-side flow holes with respect to a flow direction of the gas that is being measured, and is introduced to the interior of the inner cover from the inner-side flow holes through the space between the inner cover and the outer cover.

10. A gas sensor comprising:
a sensor element which detects a specific gas component concentration in a gas that is being measured;
a housing having the sensor element disposed in the interior thereof and retained therein; and
an element cover disposed at an axial-direction tip end of the housing,
wherein the sensor element comprises:
a measurement gas chamber into which the gas that is being measured is introduced in the interior of the sensor element;
a solid electrolyte body with oxygen ion conductivity;
a reference electrode that is formed on the solid electrolyte body;
a pump electrode that constitutes a pump cell that adjusts an oxygen concentration within the gas that is being measured, using a part of the solid electrolyte body and the reference electrode;
a sensor electrode that constitutes a sensor cell that outputs a signal in accordance with the specific gas component concentration in the gas that is being measured, using a part of the solid electrolyte body and the reference electrode; and
a heater for heating the solid electrolyte body, disposed opposite the solid electrolyte body, with the solid electrolyte body separated from the heater,
wherein:
the element cover has an inner cover formed in a tubular shape having a bottom, disposed to cover the axial-direction tip end of the sensor element, and has an outer cover formed in a tubular shape having a bottom, disposed to form a space that is open to an outer side of the inner cover,
wherein the element cover further comprises:
outer-side flow holes into which the gas that is being measured is introduced in the outer cover;
inner-side flow holes into which the gas that is being measured is introduced in the inner cover, the gas being the gas which is introduced in the outer cover;
an outer-side bottom flow hole that is provided at the axial-direction tip end of the gas sensor in the bottom of the outer cover; and
an inner bottom flow hole that is provided at the axial-direction tip end of the gas sensor in the bottom of the inner cover,
wherein:
the pump electrode is formed closer to the axial-direction tip end of the sensor element than is the sensor electrode;
a base position of the inner-side flow holes is disposed closer to the axial-direction tip end of the gas sensor than is a tip position of the pump electrode, with respect to an axial direction of the gas sensor;
a distance between the base position of the inner-side flow holes and the tip position of the pump electrode, with respect to the axial direction, is greater than or equal to 0.5 mm;

the tip of the sensor element is disposed closer to the axial-direction tip end of the gas sensor than is the base position of the inner-side flow holes or is disposed closer to the axial-direction base end of the gas sensor than is the base position of the inner-side flow holes;

a distance (L1) between the tip of the sensor element and the base position of the inner-side flow holes, with respect to the axial direction, satisfies a relationship −1.6 mm≤L1<1.6 mm;

a tip position of the outer-side flow holes is disposed closer to the axial-direction tip end of the gas sensor than is the bottom of the inner cover;

a position of the inner-side flow holes is disposed closer to the axial-direction base end of the gas sensor than is a position of the outer-side flow holes; and the gas that is being measured is introduced to the interior of the gas sensor through the outer-side flow holes with respect to a flow direction of the gas that is being measured, and is introduced to the interior of the inner cover from the inner-side flow holes through the space between the inner cover and the outer cover.

11. A gas sensor comprising:

a sensor element which detects a specific gas component concentration in a gas that is being measured;

a housing having the sensor element disposed in the interior thereof and retained therein; and an element cover disposed at an axial-direction tip end of the housing, wherein the sensor element comprises:

a measurement gas chamber into which the gas that is being measured is introduced in the interior of the sensor element;

a solid electrolyte body with oxygen ion conductivity;

a reference electrode that is formed on the solid electrolyte body;

a pump electrode that constitutes a pump cell that adjusts an oxygen concentration within the gas that is being measured, using a part of the solid electrolyte body and the reference electrode;

a sensor electrode that constitutes a sensor cell that outputs a signal in accordance with the specific gas component concentration in the gas that is being measured, using a part of the solid electrolyte body and the reference electrode; and a heater for heating the solid electrolyte body, disposed opposite the solid electrolyte body, with the solid electrolyte body separated from the heater, wherein:

the element cover has an inner cover formed in a tubular shape having a bottom, disposed to cover the axial-direction tip end of the sensor element, and has an outer cover formed in a tubular shape having a bottom, disposed to form a space that is open to an outer side of the inner cover, wherein the element cover further comprises:

outer-side flow holes into which the gas that is being measured is introduced in the outer cover;

inner-side flow holes into which the gas that is being measured is introduced in the inner cover, the gas being the gas which is introduced in the outer cover;

an outer-side bottom flow hole that is provided at the axial-direction tip end of the gas sensor in the bottom of the outer cover; and an inner bottom flow hole that is provided at the axial-direction tip end of the gas sensor in the bottom of the inner cover, wherein:

the pump electrode is formed closer to the axial-direction tip end of the sensor element than is the sensor electrode;

a base position of the inner-side flow holes is disposed closer to the axial-direction tip end of the gas sensor than is a tip position of the pump electrode, with respect to an axial direction of the gas sensor;

a distance between the base position of the inner-side flow holes and the tip position of the pump electrode, with respect to the axial direction, is greater than or equal to 0.5 mm;

the tip of the sensor element is disposed closer to the axial-direction tip end of the gas sensor than is the base position of the inner-side flow holes or is disposed closer to the axial-direction base end of the gas sensor than is the base position of the inner-side flow holes;

a distance (L1) between the tip of the sensor element and the base position of the inner-side flow holes, with respect to the axial direction, satisfies a relationship −1.6 mm≤L1<1.6 mm; and a position of the inner-side flow holes is disposed closer to the axial-direction base end of the gas sensor than is a position of the outer-side flow holes.

12. The gas sensor according to claim 11, wherein the gas that is being measured is introduced to the interior of the gas sensor through the outer-side flow holes with respect to a flow direction of the gas that is being measured, and is introduced to the interior of the inner cover from the inner-side flow holes through the space between the inner cover and the outer cover.

* * * * *